US010757125B2

(12) United States Patent
Wakasugi et al.

(10) Patent No.: US 10,757,125 B2
(45) Date of Patent: Aug. 25, 2020

(54) ANOMALY DETECTION METHOD AND RECORDING MEDIUM

(71) Applicant: Panasonic Intellectual Property Management Co., Ltd., Osaka (JP)

(72) Inventors: Kensuke Wakasugi, Tokyo (JP); Yoshikuni Sato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 167 days.

(21) Appl. No.: 16/135,520

(22) Filed: Sep. 19, 2018

(65) Prior Publication Data

US 2019/0098034 A1   Mar. 28, 2019

(30) Foreign Application Priority Data

Sep. 27, 2017 (JP) .................................. 2017-187056

(51) Int. Cl.
*H04L 29/06* (2006.01)
*G06N 3/08* (2006.01)
(Continued)

(52) U.S. Cl.
CPC .......... *H04L 63/1425* (2013.01); *G06N 3/08* (2013.01); *G06T 5/002* (2013.01); *G06T 7/0002* (2013.01);
(Continued)

(58) Field of Classification Search
CPC .................................................. H04L 63/1425
See application file for complete search history.

(56) References Cited

U.S. PATENT DOCUMENTS 8,306,931 B1 * 11/2012 Bowman .............. G06N 3/0454
706/27
2012/0284791 A1 * 11/2012 Miller .................... G06N 7/005
726/22
(Continued)

FOREIGN PATENT DOCUMENTS

WO     2016/132468      8/2016

OTHER PUBLICATIONS

Pascal Vincent, "A Connection Between Score Matching and Denoising Autoencoders", Neural Computation, vol. 23, Issue7, Jul. 2011, pp. 1661-1674.
(Continued)

*Primary Examiner* — Simon P Kanaan
(74) *Attorney, Agent, or Firm* — Wenderoth, Lind & Ponack, L.L.P.

(57) ABSTRACT

An anomaly detection method includes generating second data by adding normal noise to first data; generating third data by adding abnormal noise to the first data; inputting the first data, the second data, and the third data to a neural network; calculating a first normal score, a second normal score, and a third normal score; calculating a third difference based on a first difference and a second difference, the first difference being based on a difference between the first normal score and the second normal score, the second difference being based on a difference between the first normal score and the third normal score; changing the neural network so that the third difference becomes smallest; inputting, to the changed neural network, fourth data that is unknown in terms of whether the fourth data is normal or abnormal; and determining whether the fourth data is normal or abnormal.

13 Claims, 9 Drawing Sheets

(51) Int. Cl.
  *G06T 7/13*    (2017.01)
  *G06T 7/136*   (2017.01)
  *G06T 7/12*    (2017.01)
  *G06T 5/00*    (2006.01)
  *G06T 7/00*    (2017.01)

(52) U.S. Cl.
  CPC .............. *G06T 7/12* (2017.01); *G06T 7/13* (2017.01); *G06T 7/136* (2017.01); *G06T 2207/20081* (2013.01); *G06T 2207/20084* (2013.01); *G06T 2207/30168* (2013.01)

(56) References Cited

U.S. PATENT DOCUMENTS

| | | | |
|---|---|---|---|
| 2016/0219067 A1* | 7/2016 | Han, II | H04L 63/1425 |
| 2017/0279834 A1* | 9/2017 | Vasseur | G06N 20/00 |
| 2018/0130207 A1* | 5/2018 | Anderson | G06T 5/50 |
| 2020/0104990 A1* | 4/2020 | Kimura | G06K 9/6284 |

OTHER PUBLICATIONS

Shuangfei Zhai et al., "Deep Structured Energy Based Models for Anomaly Detection", Proceedings of the 33rd international Conference on Machine Learning, vol. A8, Jun. 2016, pp. 1100-1109.

Jiquan Ngiam et al., "Learning Deep Energy Models", Proceedings of the 28th international Conference on Machine Learning, Jun. 2011, pp. 1105-1112.

Pascal Vincent et al., "Extracting and Composing Robust Features with Denoising Autoencoders", Proceedings of the 25th international Conference on Machine Learning, Jul. 2008, pp. 1096-1103.

\* cited by examiner

ANOMALY DETECTION METHOD AND RECORDING MEDIUM

BACKGROUND

1. Technical Field

The present disclosure relates to an anomaly detection method using a neural network and a recording medium.

2. Description of the Related Art

Pascal Vincent, "A Connection Between Score Matching and Denoising Autoencoders", Neural Computation, July 2011, Vol. 23, Issue 7, pp. 1661-1674 (hereinafter referred to as Non-Patent Document 1) discloses a relationship between a learning method called score matching and a learning method called denoising autoencoders. Score matching is advantageous in being applicable to various models and is disadvantageous in having difficulty in learning. However, Non-Patent Document 1 shows that the solution obtained from score matching and the solution obtained from denoising autoencoders match each other. Thus, learning can be easily performed with the advantage of being applicable to various models being maintained, by expressing models using score matching and by performing learning using denoising autoencoders. Shuangfei Zhai et al., "Deep structured energy based models for anomaly detection", Proceedings of the 33rd International Conference on Machine Learning (ICML, 2016), June 2016, Vol. 48, pp. 1100-1109 (hereinafter referred to as Non-Patent Document 2) discloses an anomaly detection method using, based on the method disclosed in Non-Patent Document 1, a multilayer neural network for image data, time-series data, and multidimensional data, International Publication No. 2016/132468 (hereinafter referred to as Patent Document 1) discloses a method for detecting a failure by using a reconstructive neural network.

SUMMARY

Application of the techniques described in Non-Patent Documents 1 and 2 to anomaly detection using the neural network described in Patent Document 1 may cause a decrease in accuracy.

One non-limiting and exemplary embodiment provides an anomaly detection method and a recording medium for increasing the accuracy of anomaly detection using a neural network.

In one general aspect, the techniques disclosed here feature an anomaly detection method including (a1) obtaining first data which is normal data, the normal data being data that is determined to be normal by a neural network; (a2) generating second data by adding normal noise to the first data by using a method predetermined in accordance with a kind of the first data, the second data being data that is determined to be normal by the neural network; (a3) generating third data by adding abnormal noise to the first data by using a method predetermined in accordance with the kind of the first data, the third data being data that is determined to be abnormal by the neural network; (a4) inputting the first data, the second data, and the third data to the neural network and calculating a first normal score, a second normal score, and a third normal score, each of the first normal score, the second normal score, and the third normal score being a value indicating how much a corresponding one of the first data, the second data, and the third data input to the neural network is likely to be normal data; (a5) calculating a first difference that is based on a difference between the first normal score and the second normal score, calculating a second difference that is based on a difference between the first normal score and the third normal score, and calculating a third difference that is based on a difference between the first difference and the second difference; (a6) calculating parameters of the neural network, the parameters making the third difference smallest; (a7) changing the neural network by using the parameters that have been calculated; and (a8) obtaining fourth data from a test database storing data that is unknown in terms of whether the data is normal or abnormal, inputting the fourth data to the neural network that has been changed, calculating a fourth normal score, and determining, based on the fourth normal score, whether the fourth data is normal or abnormal. At least one of the (a1) to the (a8) is executed by a processor.

It should be noted that the foregoing general or specific aspect may be implemented as a system, an apparatus, a method, an integrated circuit, a computer program, a computer-readable recording medium, such as a recording disc, or any selective combination thereof. The computer-readable recording medium includes, for example, a nonvolatile recording medium, such as a compact disc-read only memory (CD-ROM).

According to an anomaly detection method and so forth of an embodiment of the present disclosure, the accuracy of anomaly detection using a neural network can be increased.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
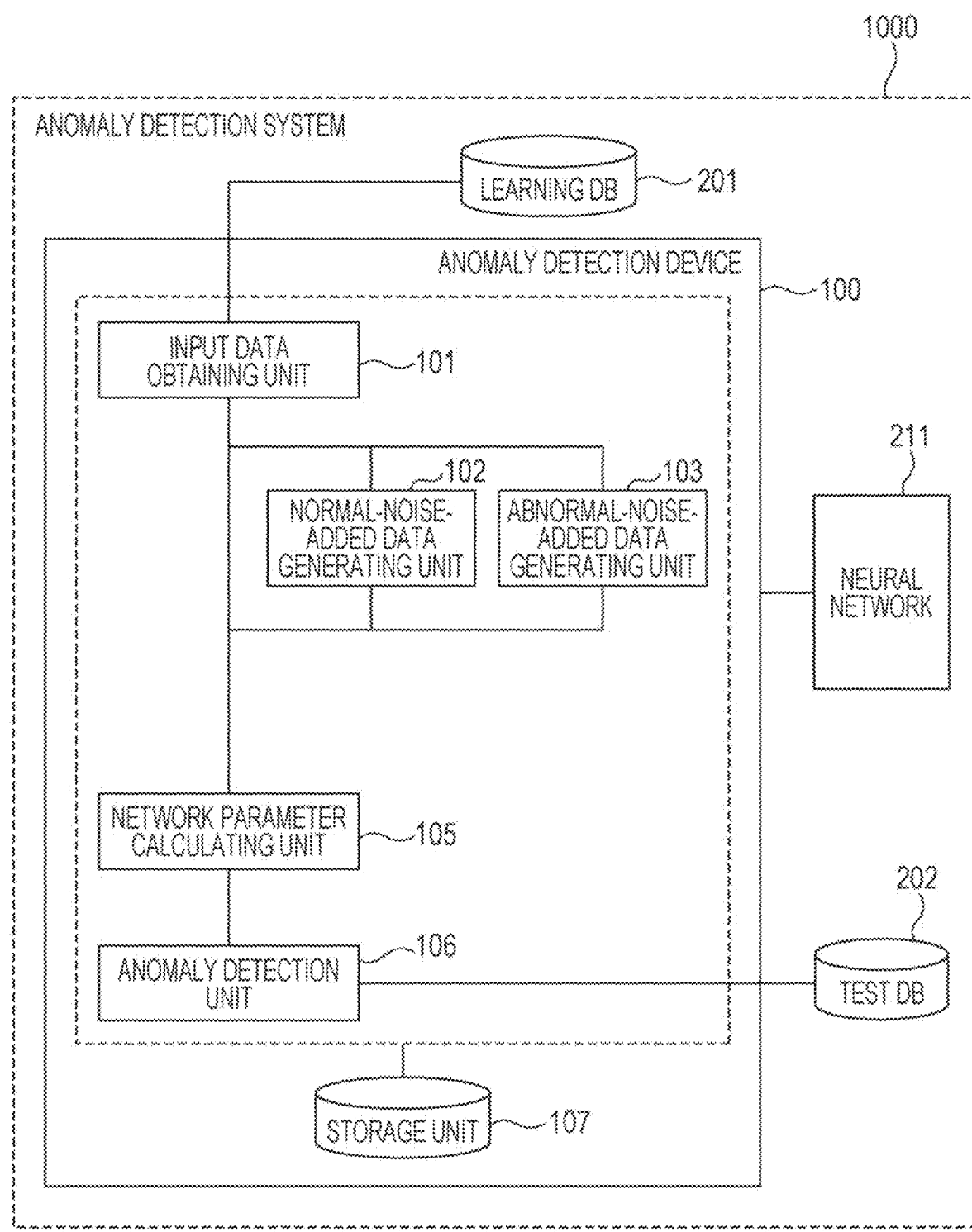
FIG. 1 is a block diagram illustrating the functional configuration of an anomaly detection system according to an embodiment.

Underlying Knowledge Forming Basis of the Present Disclosure

In recent years, in the fields of image recognition, natural language processing, and the like, recognition and identification methods based on a multilayer neural network have been remarkably progressing and have started to be applied to anomaly detection methods. For example, Patent Document 1 discloses a system for detecting a failure of a device by combining a reconstructive neural network and a discriminative neural network. The reconstructive neural network is an autoencoder. For example, Pascal Vincent et al., "Extracting and composing robust features with denoising autoencoders", Proceedings of the 25th International Conference on Machine learning (ICML. 2008), 2008, pp. 1096-1103 (hereinafter referred to as Non-Patent Document 4) discloses a denoising autoencoder that adds noise to learning data and removing the noise by an autoencoder. Typically, Gaussian noise is used as the noise. For example, J. Ngiam, Z. Chen, P. W. Koh, and A. Y. Ng, "Learning Deep Energy Models", Proceedings of the 28th International Conference on Machine Learning (ICML. 2011), 2011, pp. 1105-1112 (hereinafter referred to as Non-Patent Document 3) discloses an energy-based model in which unsupervised learning is performed by using an output of a multilayer neural network as energy.

In the case of using a denoising autoencoder, an objective function serving as a guide to learning is defined as a difference between input data and reconstructed data. Calculating the objective function is easy, however, the necessity of an encoder and a decoder produces disadvantages that neural network parameters to be used for the calculation increase or that available network structures are limited. In the case of using an energy-based model, the unnecessity of a network corresponding to a decoder in a denoising autoencoder produces advantages that various network structures are available. However, it is difficult to calculate the value of an objective function serving as a guide to learning.

Non-Patent Document 1 discloses a connection between denoising autoencoders and score matching. Specifically, Non-Patent Document 1 discloses a correlation between denoising autoencoders and an energy-based model to which score matching is applied. The technique disclosed in this document enables learning with both an advantage of a denoising autoencoder in which the value of an objective function can be easily calculated and an advantage of an energy-based model in which various network structures are available. In Non-Patent Document 1, a Gaussian distribution is used for a noise function of a denoising autoencoder, based on the assumption that the solution obtained from the energy-based model matches the solution obtained from the denoising autoencoder and that a real distribution around learning data can be approximated by a Gaussian distribution. Non-Patent Document 2 discloses an anomaly detection method that uses a multilayer neural network for image data, time-series data, and multidimensional data, based on the method disclosed in Non-Patent Document 1.

The inventors found that the accuracy of approximate calculation is susceptible to improvement in the correlation between denoising autoencoders and energy-based models disclosed in Non-Patent Document 1. Adding Gaussian noise to input data and learning to reconstruct the input data by a neural network in a denoising autoencoder is equivalent to approximating the distribution around input data by a Gaussian distribution and calculating an integral when calculating an expected value regarding the distribution of the input data in an energy-based model. However, it is not always possible to accurately approximate the distribution around the input data by a Gaussian distribution. If it is impossible to approximate the real distribution around the input data by a Gaussian distribution, the accuracy of approximation of a noise function decreases, resulting in performance degradation of a neural network when this technique is applied to an anomaly detection method or the like. Accordingly, the inventors found out that the accuracy of approximation of a noise function corresponding to noise to be added to input data needs to be increased to improve the performance of anomaly detection.

Denoising autoencoders have originally been suggested for the purpose of improving generalization performance, and approximation of a distribution of input data is not taken into consideration. Non-Patent Document 1 discloses the relationship between denoising autoencoders and energy-based models but does not refer to a method for adding noise in a denoising autoencoder. Patent Document 1 and Non-Patent Document 2 do not disclose change of a noise function for each piece of data in a denoising autoencoder. Accordingly, the inventors have conceived of a technique described below to improve the performance of anomaly detection. In the technique described below, the type of noise in a denoising autoencoder is changed to increase the accuracy of calculation of an expected value regarding a distribution of input data in an energy-based model and to improve learning of a normal model, thereby improving the performance of anomaly detection.

An anomaly detection method according to an aspect of the present disclosure includes (a1) obtaining first data which is normal data, the normal data being data that is determined to be normal by a neural network; (a2) generating second data by adding normal noise to the first data by using a method predetermined in accordance with a kind of the first data, the second data being data that is determined to be normal by the neural network; (a3) generating third data by adding abnormal noise to the first data by using a method predetermined in accordance with the kind of the first data, the third data being data that is determined to be abnormal by the neural network; (a4) inputting the first data, the second data, and the third data to the neural network and calculating a first normal score, a second normal score, and a third normal score, each of the first normal score, the second normal score, and the third normal score being a value indicating how much a corresponding one of the first data, the second data, and the third data input to the neural network is likely to be normal data; (a5) calculating a first difference that is based on a difference between the first normal score and the second normal score, calculating a second difference that is based on a difference between the first normal score and the third normal score, and calculating a third difference that is based on a difference between the first difference and the second difference; (a6) calculating parameters of the neural network, the parameters making the third difference smallest; (a7) changing the neural network by using the parameters that have been calculated; and (a8) obtaining fourth data from a test database storing data that is unknown in terms of whether the data is normal or abnormal, inputting the fourth data to the neural network that has been changed, calculating a fourth normal score, and determining, based on the fourth normal score, whether the fourth data is normal or abnormal. At least one of the (a1) to the (a8) is executed by a processor.

According to the aspect, normal noise and abnormal noise are used as noise to be added to normal data. Accordingly, the approximation accuracy of the distribution of normal data can be increased, and the value of an objective function of the neural network can be calculated more accurately during learning. As a result, learning of a normal model can be improved and the performance of anomaly detection can be increased. The database may be constituted by a single database or multiple databases. The first data may be stored in a learning database, which will be described below.

For example, in a denoising autoencoder, a normal model is learned in which input data is a local solution. In a case where Gaussian noise is merely used, Gaussian noise is uniformly added regardless of input data, and input data added with noise is regarded as data in which the normal score decreases. However, noise added to input data does not always decrease the normal score. For example, it is assumed that an image A of a numeral "0" is regarded as normal, and the normal score of the image A is a normal score A. In a case where a difference between the image A and an image B is a small difference in the position of the image of the numeral "0", a small difference in inclination, or a small difference in the thickness of line, the normal score of the image B is considered to be equivalent to the normal score A. Accordingly, abnormal noise that decreases the normal score and normal noise that does not decrease the normal score are used to add noise, the abnormal noise and the normal noise are distinguished from each other, and thereby the value of an objective function in an energy-based model can be accurately calculated.

It is difficult to describe all methods for adding noise while preventing a decrease in normal score and to define normal noise. However, if part of the method for adding noise in which input data is regarded as normal data after adding noise thereto is defined as normal noise on the basis of knowledge about input data, normal noise that is included in abnormal noise in the denoising autoencoder according to the related art can be appropriately dealt with, and accordingly the calculation accuracy of the value of an objective function can be increased.

In the anomaly detection method according to the aspect of the present disclosure, in a case where the first data is an image, the anomaly detection method may further include, between the (a1) and the (a2), (b1) detecting pixel positions of edges included in the image; and (b2) setting, as an abnormal noise region, a region of pixel positions that are at a first distance or less from the pixel positions of the edges, and setting, as a normal noise region, a region that is not included in the abnormal noise region in the image. The predetermined method in the (a2) may be generating the second data by adding noise to the normal noise region, and the predetermined method in the (a3) may be generating the third data by adding noise to the abnormal noise region.

According to the aspect, noise that may change the shape of an image of a subject and that may change normal data to abnormal data can be regarded as abnormal noise, and noise that does not change the shape of an image of a subject and that does not change normal data to abnormal data can be regarded as normal noise. Accordingly, the value of an objective function in the neural network can be accurately calculated and the performance of anomaly detection can be increased.

In the anomaly detection method according to the aspect of the present disclosure, in a case where the first data is time-series data having data values corresponding to times, the anomaly detection method may further include, in the (a1), (c1) calculating an average value of the data values; (c2) counting a number of large data values larger than the average value among the data values in order from a data value closest to the average value, setting, as an upper threshold value, a data value corresponding to a predetermined percentage of a total number of the large data values, counting a number of small data values smaller than the average value among the data values in order from a data value closest to the average value, and setting, as a lower threshold value, a data value corresponding to a predetermined percentage of a total number of the small data values; (c3) setting, as a normal noise region, a region included in a range from the upper threshold value to the lower threshold value; and (c4) setting, as an abnormal noise region, a region not included in the normal noise region. In the (a2), in a case where an i-th data value included in the data values is included in the normal noise region, the normal noise may be added to the i-th data value. In the (a3), in a case where a j-th data value included in the data values is included in the abnormal noise region, the abnormal noise may be added to the j-th data value.

According to the aspect, noise that may change the pattern of time-series data and that may change normal data to abnormal data can be regarded as abnormal noise, and noise that does not change the pattern of time-series data and that does not change normal data to abnormal data can be regarded as normal noise. Accordingly, the value of an objective function in the neural network can be accurately calculated and the performance of anomaly detection can be increased.

In the anomaly detection method according to the aspect of the present disclosure, in a case where the first data is time-series data having data values corresponding to times, the anomaly detection method may further include, in the (a1), (d1) calculating differential data values corresponding to the data values; (d2) calculating an average value of the differential data values; (d3) counting a number of large differential data values larger than the average value among the differential data values in order from a differential data value closest to the average value, setting, as an upper threshold value, a differential data value corresponding to a predetermined percentage of a total number of the large differential data values, counting a number of small differential data values smaller than the average value among the differential data values in order from a differential data value closest to the average value, and setting, as a lower threshold value, a differential data value corresponding to a predetermined percentage of a total number of the small differential data values; (d4) setting, as a normal noise region, a region included in a range from the upper threshold value to the lower threshold value; and (d5) setting, as an abnormal noise region, a region not included in the normal noise region. In the (a2) to the (a4), the differential data values may be used instead of the data values of the first data. In the (a2), in a case where an i-th differential data value included in the differential data values is included in the normal noise region, the normal noise may be added to the i-th differential data value. In the (a3), in a case where a j-th differential data value included in the differential data values is included in the abnormal noise region, the abnormal noise may be added to the j-th differential data value. In the (a8), differential values of data values included in the fourth data may be used instead of the data values included in the fourth data.

According to the aspect, noise that may change time-series data from normal data to abnormal data over time can be regarded as abnormal noise, and noise that does not change time-series data from normal data to abnormal data over time can be regarded as normal noise. Accordingly, the value of an objective function in the neural network can be accurately calculated and the performance of anomaly detection can be increased.

In the anomaly detection method according to the aspect of the present disclosure, in a case where the first data is multidimensional data, the anomaly detection method may further include, in the (a1), (e1) performing principal component analysis on the first data and calculating an eigenvalue and an eigenvector of a principal component; (e2) calculating, based on the eigenvalue and the eigenvector, a differential direction of the first data; (e3) setting the differential direction as an abnormal noise direction; and (e4) setting a direction perpendicular to the abnormal noise direction as a normal noise direction. The predetermined method in the (a2) may be generating the second data by adding noise in the normal noise direction to the first data, and the predetermined method in the (a3) may be generating the third data by adding noise in the abnormal noise direction to the first data.

According to the aspect, noise that may change multidimensional data from normal data to abnormal data can be regarded as abnormal noise, and noise that does not change multidimensional data from normal data to abnormal data can be regarded as normal noise. Accordingly, the value of an objective function in the neural network can be accurately calculated and the performance of anomaly detection can be increased.

In the anomaly detection method according to the aspect of the present disclosure, the (a7) may include calculating an amount of change in the third difference before and after the neural network changes, changing the neural network in a case where the third difference decreases, and changing the neural network at a probability that is based on the amount of change in the third difference in a case where the third difference increases.

A recording medium according to another aspect of the present disclosure is a recording medium storing a program that causes a device including a processor to execute a process, the recording medium being nonvolatile and computer-readable. The process includes (a1) obtaining first data which is normal data, the normal data being data that is determined to be normal by a neural network; (a2) generating second data by adding normal noise to the first data by using a method predetermined in accordance with a kind of the first data, the second data being data that is determined to be normal by the neural network; (a3) generating third data by adding abnormal noise to the first data by using a method predetermined in accordance with the kind of the first data, the third data being data that is determined to be abnormal by the neural network; (a4) inputting the first data, the second data, and the third data to the neural network and calculating a first normal score, a second normal score, and a third normal score, each of the first normal score, the second normal score, and the third normal score being a value indicating how much a corresponding one of the first data, the second data, and the third data input to the neural network is likely to be normal data; (a5) calculating a first difference that is based on a difference between the first normal score and the second normal score, calculating a second difference that is based on a difference between the first normal score and the third normal score, and calculating a third difference that is based on a difference between the first difference and the second difference; (a6) calculating parameters of the neural network, the parameters making the third difference smallest; (a7) changing the neural network by using the parameters that have been calculated; and (a8) obtaining fourth data from a test database storing data that is unknown in terms of whether the data is normal or abnormal, inputting the fourth data to the neural network that has been changed, calculating a fourth normal score, and determining, based on the fourth normal score, whether the fourth data is normal or abnormal. According to the other aspect, an effect similar to that in the anomaly detection method according to the foregoing aspect of the present disclosure can be obtained.

In the recording medium according to the other aspect of the present disclosure, in a case where the first data is an image, the process may further include, between the (a1) and the (a2), (b1) detecting pixel positions of edges included in the image; and (b2) setting, as an abnormal noise region, a region of pixel positions that are at a first distance or less from the pixel positions of the edges, and setting, as a normal noise region, a region that is not included in the abnormal noise region in the image. The predetermined method in the (a2) may be generating the second data by adding noise to the normal noise region, and the predetermined method in the (a3) may be generating the third data by adding noise to the abnormal noise region.

In the recording medium according to the other aspect of the present disclosure, in a case where the first data is time-series data having data values corresponding to times, the process may further include, in the (a1), (c1) calculating an average value of the data values; (c2) counting a number of large data values larger than the average value among the data values in order from a data value closest to the average value, setting, as an upper threshold value, a data value corresponding to a predetermined percentage of a total number of the large data values, counting a number of small data values smaller than the average value among the data values in order from a data value closest to the average value, and setting, as a lower threshold value, a data value corresponding to a predetermined percentage of a total number of the small data values; (c3) setting, as a normal noise region, a region included in a range from the upper threshold value to the lower threshold value; and (c4) setting, as an abnormal noise region, a region not included in the normal noise region. In the (a2), in a case where an i-th data value included in the data values is included in the normal noise region, the normal noise may be added to the i-th data value. In the (a3), in a case where a j-th data value included in the data values is included in the abnormal noise region, the abnormal noise may be added to the j-th data value.

In the recording medium according to the other aspect of the present disclosure, in a case where the first data is time-series data having data values corresponding to times, the process may further include, in the (a1), (d1) calculating differential data values corresponding to the data values; (d2) calculating an average value of the differential data values; (d3) counting a number of large differential data values larger than the average value among the differential data values in order from a differential data value closest to the average value, setting, as an upper threshold value, a differential data value corresponding to a predetermined percentage of a total number of the large differential data values, counting a number of small differential data values smaller than the average value among the differential data values in order from a differential data value closest to the average value, and setting, as a lower threshold value, a differential data value corresponding to a predetermined percentage of a total number of the small differential data values; (d4) setting, as a normal noise region, a region included in a range from the upper threshold value to the lower threshold value; and (d5) setting, as an abnormal noise region, a region not included in the normal noise region. In the (a2) to the (a4), the differential data values may be used instead of the data values of the first data. In the (a2), in a case where an i-th differential data value included in the differential data values is included in the normal noise region, the normal noise may be added to the i-th differential data value. In the (a3), in a case where a j-th differential data value included in the differential data values is included in the abnormal noise region, the abnormal noise may be added to the j-th differential data value. In the (a8), differential values of data values included in the fourth data may be used instead of the data values included in the fourth data.

In the recording medium according to the other aspect of the present disclosure, in a case where the first data is multidimensional data, the process may further include, in the (a1), (e1) performing principal component analysis on the first data and calculating an eigenvalue and an eigenvector of a principal component; (e2) calculating, based on the eigenvalue and the eigenvector, a differential direction of the first data; (e3) setting the differential direction as an abnormal noise direction; and (e4) setting a direction perpendicular to the abnormal noise direction as a normal noise direction. The predetermined method in the (a2) may be generating the second data by adding noise in the normal noise direction to the first data, and the predetermined method in the (a3) may be generating the third data by adding noise in the abnormal noise direction to the first data.

In the recording medium according to the other aspect of the present disclosure, the (a7) may include calculating an amount of change in the third difference before and after the neural network changes, changing the neural network in a case where the third difference decreases, and changing the neural network at a probability that is based on the amount of change in the third difference in a case where the third difference increases.

The operation and effect of the anomaly detection method are also realized in an anomaly detection device and an anomaly detection system. It should be noted that the foregoing general or specific aspects may be implemented as a system, an apparatus, a method, an integrated circuit, a computer program, a computer-readable recording medium, such as a recording disc, or any selective combination thereof. The computer-readable recording medium includes, for example, a nonvolatile recording medium, such as a CD-ROM.

EMBODIMENT

Hereinafter, an embodiment will be descried with reference to the drawings. The embodiment described below is a general or specific example. The values, shapes, elements, arrangement positions and connection states of the elements, steps, order of steps, and so forth described in the embodiment are merely examples and do not limit the present disclosure. Among the elements described in the following embodiment, an element that is not described in an independent claim stating the broadest concept will be described as an optional element. In the following description of the embodiment, an expression accompanied by "substantially", such as "substantially parallel" or "substantially orthogonal", may be used. For example, "substantially parallel" means not only "completely parallel" but also "substantially parallel", that is, a difference of about several % is included. The same applies to another expression accompanied by "substantially". Each figure in the drawings is a schematic diagram and is not necessarily strict illustration. In each figure, the elements that are substantially the same are denoted by the same reference numerals, and duplicate description will be omitted or simplified.

FIG. 1 is a block diagram illustrating the functional configuration of an anomaly detection system 1000 according to the embodiment. The anomaly detection system 1000 detects, using a neural network 211, whether or not input data has an anomaly. Furthermore, the anomaly detection system 1000 increases anomaly detection accuracy by performing machine learning using the neural network 211.

As illustrated in FIG. 1, the anomaly detection system 1000 includes an anomaly detection device 100, a leaning database (hereinafter referred to as "learning DB") 201, a test database (hereinafter referred to as "test DB") 202, and the neural network 211. The anomaly detection device 100 includes an input data obtaining unit 101, a normal-noise-added data generating unit 102, an abnormal-noise-added data generating unit 103, a network parameter calculating unit 105, an anomaly detection unit 106, and a storage unit 107. Alternatively, the anomaly detection device 100 may include the neural network 211.

The input data obtaining unit 101, the normal-noise-added data generating unit 102, the abnormal-noise-added data generating unit 103, the network parameter calculating unit 105, and the anomaly detection unit 106, which are the elements of the anomaly detection device 100, and the neural network 211 may be configured by a processing circuit including a processor, such as a central processing unit (CPU) or a digital signal processor (DSP), and memories, such as a random access memory (RAM) and a read only memory (ROM). Some or all of the functions of the above-described elements may be achieved by executing, by the CPU or the DSP, a program recorded on the ROM by using the RAM as a working memory. Alternatively, some or all of the functions of the above-described elements may be achieved by a dedicated hardware circuit, such as an electronic circuit or an integrated circuit. Some or all of the functions of the above-described elements may be configured by a combination of a software function and a hardware circuit. The program may be provided as an application. The application may be provided through communication using a communication network, such as the Internet, communication based on a mobile communication standard, or broadcasting. The application may be provided by using a wireless network or a wired network.

The learning DB 201 and the test DB 202 may be disposed in a single device together with the anomaly detection device 100 or may be disposed in a device separated from the anomaly detection device 100. In a case where the learning DB 201 and the test DB 202 are disposed in a device separated from the anomaly detection device 100, the learning DB 201 and the test DB 202 may be connected to the anomaly detection device 100 through wired communication or wireless communication. In a case where the learning DB 201 and the test DB 202 are connected to the anomaly detection device 100 through wireless communication, each of the learning DB 201 and the test DB 202 may be connected to the anomaly detection device 100 through a communication network, such as the Internet. In this case, the learning DB 201 and the test DB 202 may be disposed in a cloud server. The anomaly detection device 100 may be disposed in a single device or may be separately disposed in two or more devices. In a case where the anomaly detection device 100 is separately disposed in two or more devices, the two or more devices may be connected to each other through wired communication or wireless communication. For example, the input data obtaining unit 101, the normal-noise-added data generating unit 102, the abnormal-noise-added data generating unit 103, and the network parameter calculating unit 105, which are related to learning of a neural network described below, may be disposed in a cloud server.

The learning DB 201 and the test DB 202 are able to store information therein, and the information stored in the learning DB 201 and the test DB 202 can be retrieved therefrom. The learning DB 201 stores first input data that is regarded as normal data in the anomaly detection system 1000. For example, normal data is data representing a normal state, accurate data, or the like, whereas abnormal data is data representing an abnormal state, inaccurate data, or the like.

The definition of normal data and abnormal data may be determined by a user in accordance with the application of data. For example, in the case of time-series data of a vibration sensor installed in a building, data obtained in a state where the building has a crack or damage may be regarded as abnormal data, and data obtained in other states may be regarded as normal data. Alternatively, data obtained in a state where an earthquake has occurred may be regarded as abnormal data, and data obtained in other states may be regarded as normal data.

Specifically, the user allows the learning DB 201 to store only normal data, thereby defining the normal data. That is, the user may store, in the learning DB 201, data that the user desires to deal with as normal data. In a case where abnormal data, such as data representing the occurrence of a crack or damage or the occurrence of an earthquake, is not always observed and it is difficult to accurately categorize only normal data in advance, the normal data may include abnormal data at a certain percentage, for example, 10%.

The first input data may be any of image data, time-series data, and multidimensional data. The first input data may be stored in association with the kind of data. The kind of data is a category of data, for example, image data, time-series data, multidimensional data, or the like. The test DB 202 stores second input data that is unknown in terms of whether the data is normal or abnormal. The second input data may be any of image data, time-series data, and multidimensional data, but needs to be data of the same kind as the data in the leaning DB 201. Here, the first input data is an example of first data, and the second input data is an example of fourth data. The learning DB 201 is an example of a database. The learning DB 201 may hold pieces of normal data. The individual pieces of normal data may be different pieces of image data, time-series data, or multidimensional data.

The learning DB 201 and the test DB 202 are each implemented by, for example, a storage device, such as a ROM, a RAM, a semiconductor memory such as a flash memory, a hard disk drive, or a solid state drive (SSD).

The storage unit 107 is able to store information therein, and the information stored in the storage unit 107 can be retrieved therefrom. The storage unit 107 stores a computer program in which the individual elements of the anomaly detection device 100 execute processing, and also stores data or the like obtained from an identifying device, the learning DB 201, and the test DB 202. The storage unit 107 is implemented by, for example, a storage device, such as a ROM, a RAM, a semiconductor memory such as a flash memory, a hard disk drive, or an SSD. The storage unit 107 may include the learning DB 201 or the test DB 202 or may be separated from the learning DB 201 and the test DB 202. That is, the storage unit 107 may be the same as or different from at least one of the learning DB 201 and the test DB 202. The learning DB 201 may be the same as or different from the test DB 202. Here, the storage unit 107 is an example of a database.

The neural network 211 is a neural network having a multilayer structure including neuron layers, that is, a multilayer neural network. Each of the neuron layers includes at least one neuron. The neural network 211 includes a data operation unit (not illustrated). Upon data being input to the neural network 211, for example, the operation unit outputs a normal score of the input data by using the input data and neural network parameters including pairs of a weighting coefficient and a bias. The normal score is a value indicating how much the data input to the neural network 211 is likely to be normal data. The normal score is an index indicating whether or not the data input to the neural network 211 is normal or accurate data. The normal score is represented by, for example, a value ranging from 0 to 1. As the value becomes closer to 1, the possibility that the input data is normal data or accurate data increases.

The input data obtaining unit 101 obtains first input data, which is normal data, from the learning DB 201, and outputs the first input data to the normal-noise-added data generating unit 102, the abnormal-noise-added data generating unit 103, and the network parameter calculating unit 105.

The normal-noise-added data generating unit 102 obtains the first input data and the kind of the first input data. The normal-noise-added data generating unit 102 may obtain the kind of data associated with the first input data or may obtain the kind of data on the basis of an input by the user. In a case where the anomaly detection system 1000 includes an interface unit, the normal-noise-added data generating unit 102 may obtain an input by the user via the interface unit or may obtain an input by the user via an interface unit outside the anomaly detection system 1000 through wired communication or wireless communication.

In the case of using first input data of one predetermined kind, the normal-noise-added data generating unit 102 does not need to obtain the kind of the first input data. In this case, the first input data stored in the learning DB 201 and first and second methods described below may include only information corresponding to first input data of the predetermined kind. The storage unit 107 of the anomaly detection device 100 or a memory (not illustrated) included in the anomaly detection system 1000 stores at least one first method corresponding to the kind of data, and the normal-noise-added data generating unit 102 obtains the first method corresponding to the kind of the first input data from the memory.

The normal-noise-added data generating unit 102 generates normal-noise-added data by adding normal noise to the first input data by using the first method predetermined in accordance with the kind of the first input data, and outputs the normal-noise-added data to the network parameter calculating unit 105. Now, normal noise will be described. The first input data includes parameters. The parameters include at least one first parameter and at least one second parameter. The first parameter is a parameter having an influence of a certain degree or more on a normal score (described below). The second parameter is a parameter having an influence of less than the certain degree on the normal score. The normal noise is noise that is added to the at least one second parameter included in the parameters of the first input data.

The abnormal-noise-added data generating unit 103 obtains the first input data and the kind of the first input data. The abnormal-noise-added data generating unit 103 may obtain the kind of data associated with the first input data or may obtain the kind of data on the basis of an input by the user. In a case where the anomaly detection system 1000 includes an interface unit, the abnormal-noise-added data generating unit 103 may obtain an input by the user via the interface unit or may obtain an input by the user via an interface unit outside the anomaly detection system 1000 through wired communication or wireless communication.

The abnormal-noise-added data generating unit 103 generates abnormal-noise-added data by adding abnormal noise to the first input data obtained from the input data obtaining unit 101 by using the second method predetermined in accordance with the kind of the first input data, and outputs the abnormal-noise-added data to the network parameter calculating unit 105. Now, abnormal noise will be described. As described above, the parameters included in the first input data include at least one first parameter and at least one second parameter. The abnormal noise is noise that is added to the at least one first parameter included in the parameters included in the first input data.

The anomaly detection device 100 may include an input/output device (not illustrated). The anomaly detection device 100 may output data and a command to the neural network 211 via the input/output device. The anomaly detection device 100 may receive a response to the command from the neural network 211 via the input/output device. That is, each of the network parameter calculating unit 105 and the anomaly detection unit 106 may output data and a command to the neural network 211 via the input/output device. Each of the network parameter calculating unit 105 and the anomaly detection unit 106 may receive a response to the command from the neural network 211 via the input/output device.

The network parameter calculating unit 105 outputs, to the neural network 211, the first input data obtained from the input data obtaining unit 101, the normal-noise-added data obtained from the normal-noise-added data generating unit 102, and the abnormal-noise-added data obtained from the abnormal-noise-added data generating unit 103. The neural network 211 calculates, as an output result, a first normal score, a second normal score, and a third normal score respectively corresponding to the first input data, the normal-noise-added data, and the abnormal-noise-added data. Here, the normal-noise-added data is an example of second data and the abnormal-noise-added data is an example of third data. The neural network 211 outputs the output result, that is, the first normal score, the second normal score, and the third normal score, to the network parameter calculating unit 105.

The network parameter calculating unit 105 calculates neural network parameters by using the first normal score, the second normal score, and the third normal score obtained from the neural network 211, and outputs the calculated parameters to the anomaly detection unit 106. Specifically, the network parameter calculating unit 105 calculates a first difference that is based on the difference between the first normal score and the second normal score, and a second difference that is based on the difference between the first normal score and the third normal score. Furthermore, the network parameter calculating unit 105 subtracts a result obtained by multiplying the second difference by a coefficient from a result obtained by multiplying the first difference by a coefficient, thereby calculating a third difference, which is based on the difference between the first difference and the second difference.

The network parameter calculating unit 105 changes the neural network parameters so that the third difference becomes smallest, thereby calculating the neural network parameters that make the third difference smallest. That is, an objective function using the third difference can be defined as an objective function for learning of the neural network 211. Such an objective function uses normal data, normal data to which normal noise is added, and normal data to which abnormal noise is added. Thus, the objective function enables, in the neural network 211, higher approximation accuracy of the distribution of normal data in the case of being affected by noise. Accordingly, the calculation accuracy of the value of the objective function increases. Furthermore, the value of the objective function can be easily calculated. An example of the neural network parameters includes weighting coefficients and biases between neurons included in the neural network 211. The process of calculating the third difference from the first normal score, the second normal score, and the third normal score is expressed by the following expression 1.

$$\left. \begin{array}{l} \text{First difference} = \dfrac{(\text{First normal score} -}{\text{Second normal score})^2} \\ \text{Second difference} = \dfrac{(\text{First normal score} -}{\text{Third normal score})^2} \\ \text{Third difference} = \dfrac{((1-\alpha) \times \text{First difference}) -}{(\alpha \times \text{Second difference})} \end{array} \right\} \quad \text{Expression 1}$$

Here, the coefficient $\alpha$ is a parameter that determines which of the first difference and the second difference is given importance at the time of calculating neural network parameters, and the range thereof is (0, 1). That is, the coefficient $\alpha$ has a value ranging from 0 to 1. The degree of importance on the first difference increases as the value becomes closer to 0, and the degree of importance on the second difference increases as the value becomes closer to 1. Specifically, for example, the value of the coefficient $\alpha$ may be 0.5. To calculate the first difference and the second difference, the absolute value of the difference between normal scores may be used instead of the square of the difference between normal scores. To calculate the neural network parameters that make the third difference smallest, a known method related to neural network learning, such as backpropagation (also called "backwards propagation of errors") described in Patent Document 1, may be used. Backpropagation is one of algorithms that are used to cause a neural network to learn in machine learning. As an update expression of the neural network using backpropagation, the following expression 2 may be used, for example.

$$W\_t+1 = W\_t - \gamma \times dD(W\_t)/dW\_t \qquad \text{Expression 2}$$

W_t represents a pre-update value of a neural network parameter, and W_t+1 represents a post-update value. D(W) represents a third difference when the neural network parameter is W. $\gamma$ represents a learning coefficient.

The update expression given above may be calculated by using all the first input data. Alternatively, partial data may be extracted from the first input data, an update expression may be calculated for the partial data to update the parameter, and update may be repeated while sequentially changing the data to be extracted. Alternatively, whether or not to adopt update may be determined based on an amount of change in the third difference before and after the update. For example, update may always be adopted when the third difference decreases, and update may be adopted at the probability expressed by the following expression 3 when the third difference increases. When the third difference does not change, update may not be performed.

$$\text{Update probability} = \min(1, e^D) \qquad \text{Expression 3}$$

Here, e represents a natural logarithm and D represents an amount of decrease in the third difference. The amount of decrease D in the third difference has a positive value when the third difference decreases. Such update probability is the smaller one of 1 and $e^D$. An update probability of 1 is equivalent to an update probability of 100%. For example, when the third difference decreases, D>0 and the update probability=min(1, $e^D$>1)=1, and when the third difference increases, D<0 and the update probability=min(1, $e^D$<1)=$e^D$.

The anomaly detection unit 106 instructs the neural network 211 to adopt the updated neural network parameters output from the network parameter calculating unit 105. The neural network 211 sets the updated neural network parameters to the neural network 211. The anomaly detection unit 106 may output the updated neural network parameters to the neural network 211.

The anomaly detection unit 106 obtains second input data from the test DB 202 storing data that is unknown in terms of whether the data is normal or abnormal. The anomaly detection unit 106 outputs the second input data to the neural network 211 to which the neural network parameters obtained from the network parameter calculating unit 105 have been set, that is, to which the updated neural network parameters have been set. The neural network 211 calculates a fourth normal score for the second input data by using the updated neural network parameters. The neural network 211 outputs the fourth normal score to the anomaly detection unit 106. If the fourth normal score does not exceed a first threshold value, the anomaly detection unit 106 determines that the second input data is abnormal data. Here, the first threshold value is a predetermined threshold value. The learning DB 201 stores n pieces of normal data (n is a natural number larger than or equal to 2). In a case where the n pieces of normal data are input to the neural network 211 to which the undated neural network parameters have been set and n normal scores output from the neural network 211 to which the updated neural network parameters have been set are obtained, a value at which it is determined that 0.9×n normal scores are normal may be used as the first threshold value. Alternatively, a standard deviation σ of normal scores of normal data may be calculated, and a value obtained by subtracting 3σ from the average value of the normal scores may be used as the first threshold value.

Figure 2:
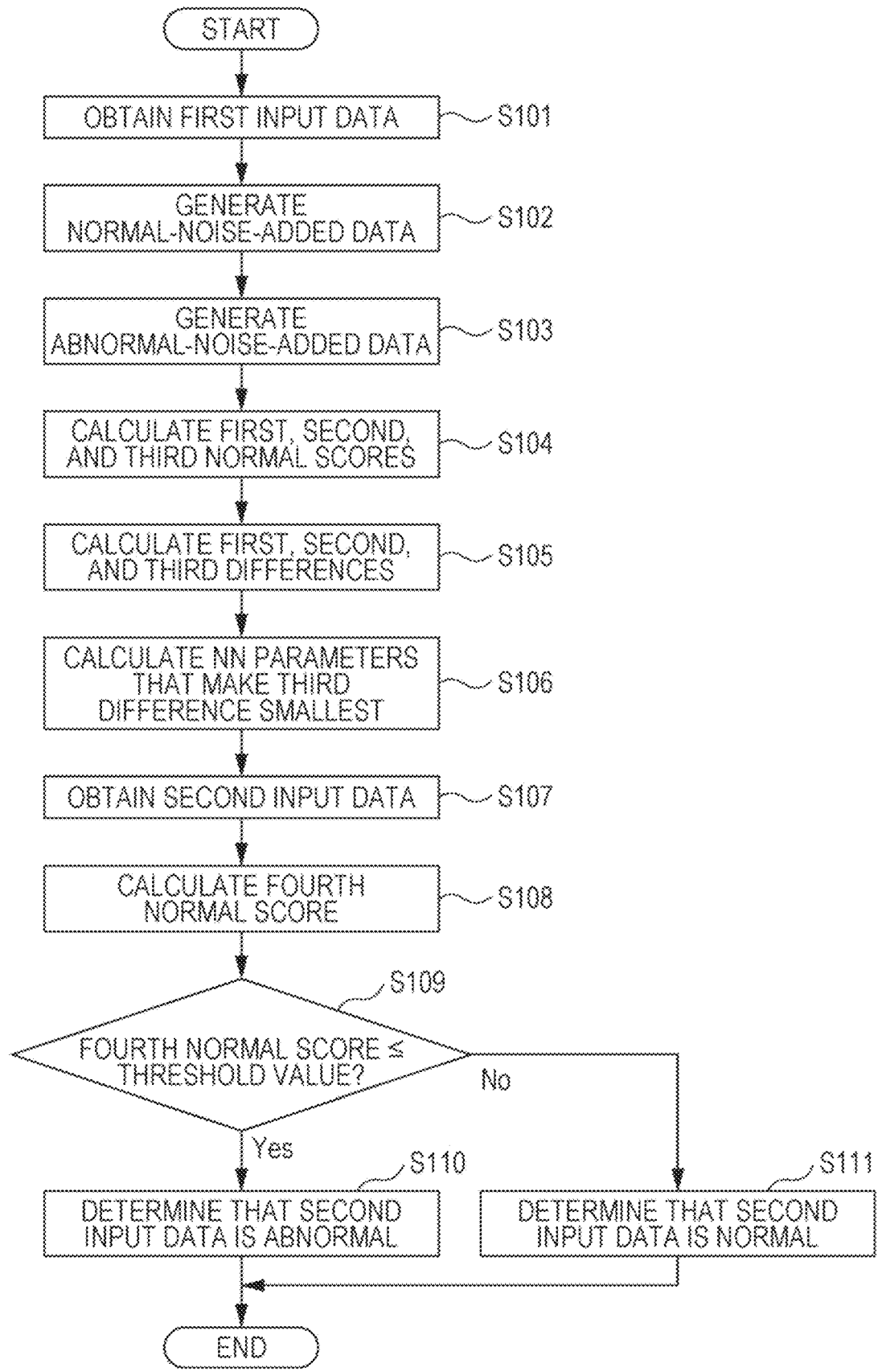
FIG. 2 is a flowchart illustrating an example of an overall flow of a process performed by an anomaly detection device according to the embodiment.

Next, an operation of the anomaly detection device 100 will be described with reference to FIG. 2. FIG. 2 is an flowchart illustrating an example of an overall flow of a process performed by the anomaly detection device 100 according to the embodiment.

In step S101 the input data obtaining unit 101 obtains first input data, which is normal data, from the learning DB 201. Furthermore, the input data obtaining unit 101 outputs the first input data to the normal-noise-added data generating unit 102, the abnormal-noise-added data generating unit 103, and the network parameter calculating unit 105.

Subsequently, in step S102, the normal-noise-added data generating unit 102 generates normal-noise-added data by adding noise to the first input data by using a normal noise addition method (also referred to as a "first method") predetermined in accordance with the kind of the first input data. The normal-noise-added data generating unit 102 outputs the generated normal-noise-added data to the network parameter calculating unit 105.

Subsequently, in step S103, the abnormal-noise-added data generating unit 103 generates abnormal-noise-added data by adding noise to the first input data by using an abnormal noise addition method (also referred to as a "second method") predetermined in accordance with the kind of the first input data. The abnormal-noise-added data generating unit 103 outputs the generated abnormal-noise-added data to the network parameter calculating unit 105.

Subsequently, in step S104, the network parameter calculating unit 105 transmits the first input data, the normal-noise-added data, and the abnormal-noise-added data to the same neural network (NN) 211. The neural network 211 calculates a first normal score, a second normal score, and a third normal score. The neural network 211 outputs the calculated first normal score, second normal score, and third normal score to the network parameter calculating unit 105. In this example, the neural network is a multilayer neural network, outputs a first normal score in response to receipt of first input data, outputs a second normal score in response to receipt of normal-noise-added data, and outputs a third normal score in response to receipt of abnormal-noise-added data.

In step S105, the network parameter calculating unit 105 calculates a first difference that is based on the difference between the first normal score and the second normal score and calculates a second difference that is based on the difference between the first normal score and the third normal score. Furthermore, the network parameter calculating unit 105 calculates a third difference that is based on the difference between the first difference and the second difference.

In step S106, the network parameter calculating unit 105 changes neural network parameters, thereby calculating neural network parameters that make the third difference smallest. The calculated neural network parameters are updated neural network parameters. The network parameter calculating unit 105 outputs the updated neural network parameters to the anomaly detection unit 106.

Subsequently, in step S107, the anomaly detection unit 106 obtains, from the test DB 202, second input data that is unknown in terms of whether the second input data is normal or abnormal. The second input data is data of the same kind as the first input data. For example, the kind of data may be image data, time-series data, or multidimensional data. Alternatively, the target of the second input data may be of the same kind as the target of the first input data. In this case, for example, if the first input data is an image of a scenery in front of an automobile, the second input data is also an image of a scenery in front of an automobile.

Subsequently, in step S108, the anomaly detection unit 106 instructs the neural network 211 to adopt the updated neural network parameters calculated in step S106. The neural network 211 sets the updated neural network parameters to the neural network 211. The anomaly detection unit 106 may output the updated neural network parameters to the neural network 211. Furthermore, the anomaly detection unit 106 outputs the second input data to the updated neural network 211 that has adopted the updated neural network parameters. The updated neural network 211 calculates a fourth normal score for the second input data by using the updated neural network parameters. The updated neural network 211 outputs the fourth normal score to the anomaly detection unit 106.

Subsequently, in step S109, the anomaly detection unit 106 compares the fourth normal score with a predetermined first threshold value. If the fourth normal score exceeds the first threshold value (NO in step S109), the anomaly detection unit 106 determines that the second input data is normal data (step S111). If the fourth normal score is smaller than or equal to the first threshold value (YES in step S109), the anomaly detection unit 106 determines that the second input data is abnormal data (step S110).

As described above, the anomaly detection device 100 causes the neural network 211 to learn by using normal data, normal-noise-added data generated by adding normal noise to the normal data, and abnormal-noise-added data generated by adding abnormal noise to the normal data, and determines whether data is normal or abnormal by using the neural network 211 that has learned. The learning of the neural network 211 is performed so that the third difference related to the difference between normal scores of the normal data, the normal-noise-added data, and the abnormal-noise-added data becomes smallest.

Figure 3:
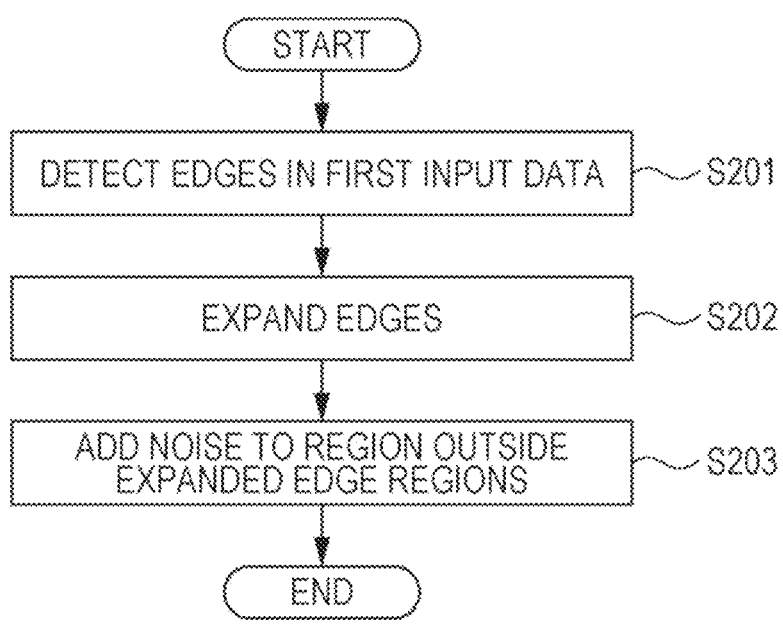
FIG. 3 is a flowchart illustrating an example of the details of a process performed in a case where first input data is an image in step S102 in FIG. 2.

With reference to FIG. 3, a description will be given of a method for calculating normal-noise-added data, which corresponds to step S102 in FIG. 2, in a case where first input data is image data. FIG. 3 is a flowchart illustrating an example of the details of a process performed in a case where first input data is an image in step S102 in FIG. 2.

First, in step S201, the normal-noise-added data generating unit 102 detects edges in the first input data, which is image data. Specifically, the normal-noise-added data generating unit 102 detects the positions of pixels corresponding to the edge in the first input data. A known method, such as Canny edge detection or differential edge detection, may be used to detect edges. Subsequently, in step S202, the normal-noise-added data generating unit 102 expands the edges detected in step S201. The method for expanding the edges may be, for example, a method for defining pixels included within a predetermined distance from the edges detected in step S201 as expanded edges. The predetermined distance may be, for example, 10 pixels, but is not limited thereto. As a result of expanding the edges in this manner, edge regions expanded around the original edges are formed.

Subsequently, in step S203, the normal-noise-added data generating unit 102 adds noise to a region in the first input data, the region being not included in the edge regions expanded in step S202, thereby calculating normal-noise-added data. Here, when the pixel values of the first input data range from 0 to 255, for example, Gaussian noise with mean 0 and variance 10 may be generated and the generated Gaussian noise may be added as noise to the pixel values. Gaussian noise is noise of a normal distribution. Alternatively, salt-and-pepper noise in which the pixel values are randomly replaced with 0 or 255, for example, at a probability of 10%, may be used as noise. Here, the region not included in the edge region is an example of a normal noise region.

Figure 4:
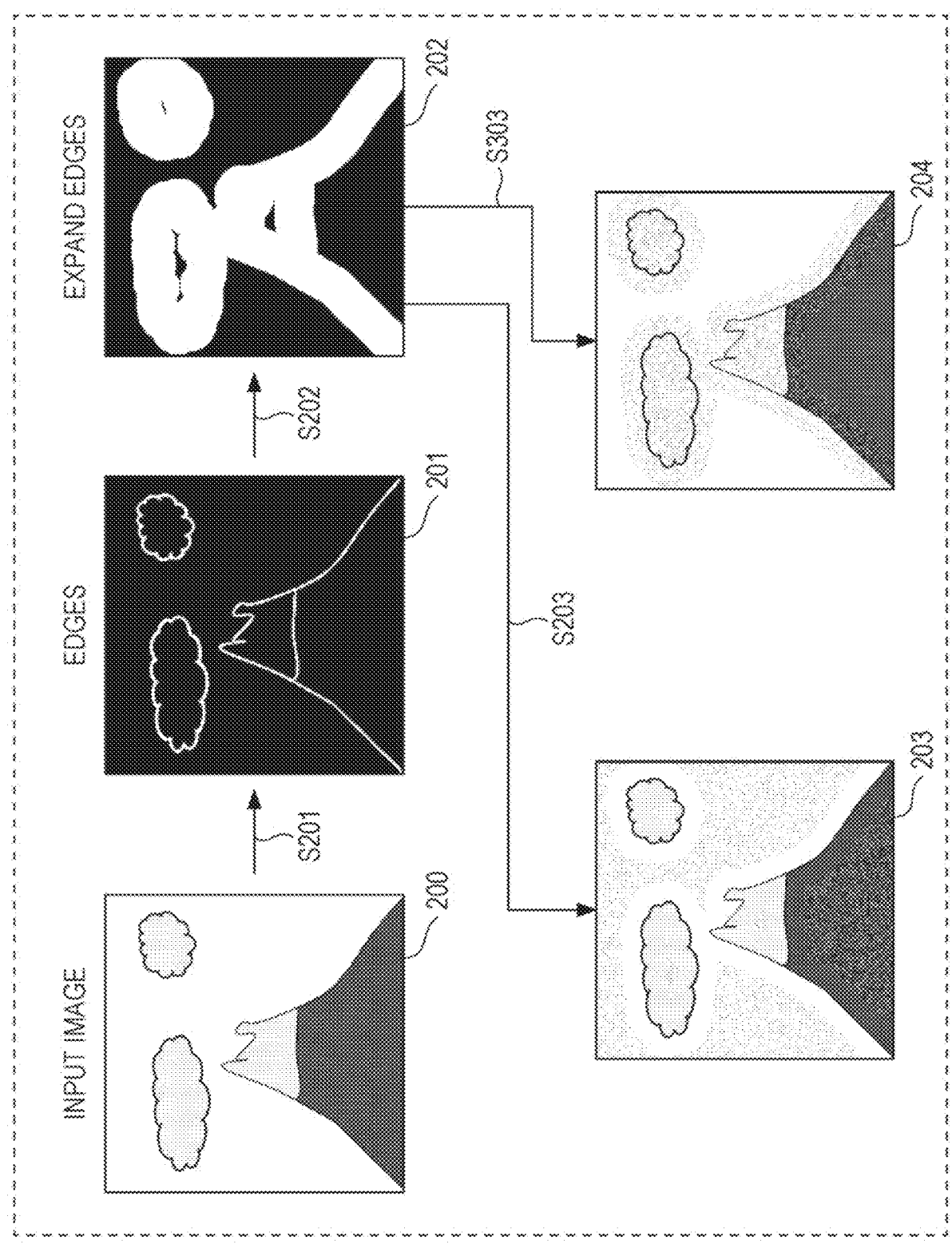
FIG. 4 is a schematic diagram illustrating an example of image data corresponding to the processes illustrated in FIGS. 3 and 5.

Now, with reference to FIG. 4, a description will be given of a specific example in which normal noise is added to image data. FIG. 4 is a schematic diagram illustrating an example of image data corresponding to the processes illustrated in FIGS. 3 and 5. An image 200 illustrated in FIG. 4 is an example of first input data. An image 201 illustrated in FIG. 4 corresponds to step 3201, an image 202 corresponds to step 3202, and an image 203 is image data obtained as a result of step S203.

The colorless line segments in the image 201 correspond to the edges detected in step S201. Compared with the colorless line segments in the image 201, the colorless line segments in the image 202 are thick. The image 202 corresponds to image data in which the edges are expanded as a result of step S202. In the image 203, the portion other than edge regions corresponding to edge portions in the image 202 is different from that in the image 200. The image 203 corresponds to image data in which normal noise has been added to the portion other than the edge regions in the image 202.

As described above, the anomaly detection device 100 performs the process from step S201 to step S203, thereby calculating normal-noise-added data in step S102 in FIG. 2.

Figure 5:
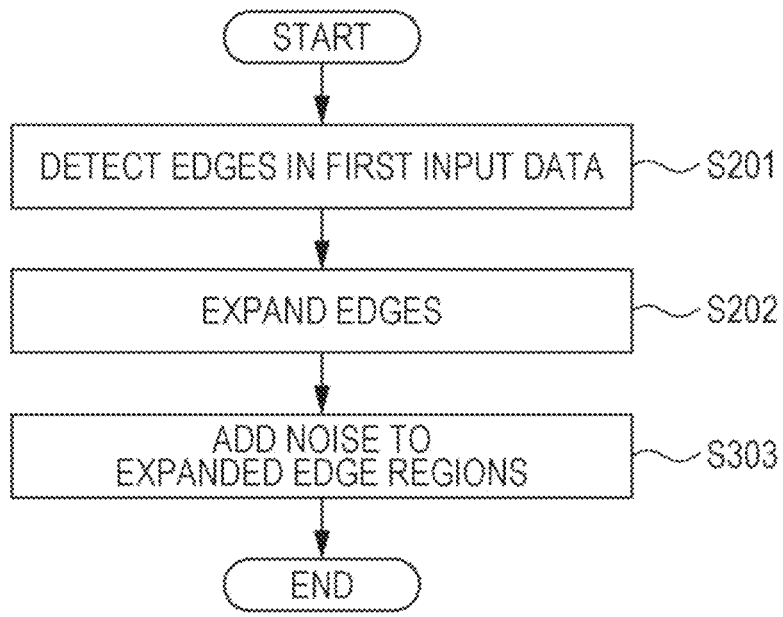
FIG. 5 is a flowchart illustrating an example of the details of a process performed in a case where first input data is an image in step S103 in FIG. 2.

Next, with reference to FIG. 5, a description will be given of a method for calculating abnormal-noise-added data, which corresponds to step S103 in FIG. 2, in a case where first input data is image data. FIG. 5 is a flowchart illustrating an example of the details of a process performed in a case where the kind of first input data is image in step S103 in FIG. 2.

First, the abnormal-noise-added data generating unit 103 performs steps S201 and S202, like the normal-noise-added data generating unit 102. Subsequently, in step S303, the abnormal-noise-added data generating unit 103 adds noise to a region in the first input data, the region being included in the edge regions expanded in step S202, thereby calculating abnormal-noise-added data. An image 204 illustrated in FIG. 4 is an example of image data in which abnormal noise has been added to the edge regions in the image 202. Here, the edge region is an example of an abnormal noise region.

As described above, the anomaly detection device 100 performs the process including steps S201, S202, and S303, thereby calculating abnormal-noise-added data in step S103 in FIG. 2.

Figure 6:
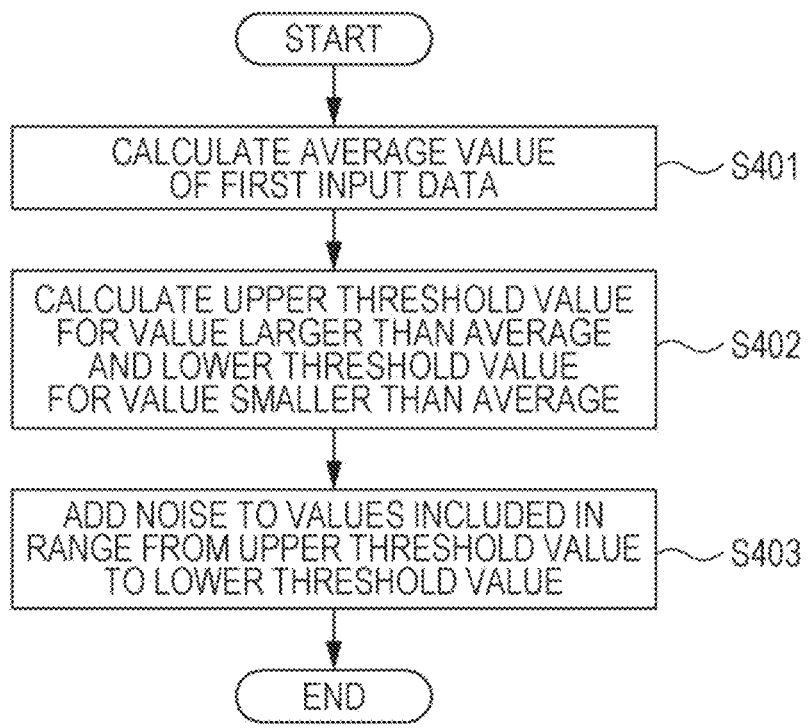
FIG. 6 is a flowchart illustrating an example of the details of a process performed in a case where first input data is time-series data in step S102 in FIG. 2.

Next, with reference to FIG. 6, a description will be given of a method for calculating normal-noise-added data, which corresponds to step S102 in FIG. 2, in a case where first input data is time-series data. FIG. 6 is a flowchart illustrating an example of the details of a process performed in a case where the kind of first input data is time-series data in step S102 in FIG. 2. Time-series data includes data in which multiple times are associated with data values, such as measurement values, measured at the multiple times.

First, in step S401, the normal-noise-added data generating unit 102 calculates an average value of pieces of data included in a target time section in the first input data, which is time-series data. The target time section may be all or some of the time sections in the first input data.

Subsequently, in step S402, the normal-noise-added data generating unit 102 calculates the number of pieces of data larger than the average value calculated in step S401 in the first input data. Specifically, the normal-noise-added data generating unit 102 counts the number of pieces of data larger than the average value in order from the piece of data closest to the average value. Furthermore, the normal-noise-added data generating unit 102 sets, as an upper threshold value, a value of data corresponding to a predetermined first percentage of the total number of pieces of data larger than the average value. The first percentage may be, for example, 80%, and is not limited thereto. In addition, the normal-noise-added data generating unit 102 also calculates the number of pieces of data smaller than the average value calculated in step S401 in the first input data and sets, based on the calculated number of pieces of data, a lower threshold value. In this case, the normal-noise-added data generating unit 102 sets, as the lower threshold value, a value of data corresponding to a predetermined second percentage of the total number of pieces of data smaller than the average value. The second percentage may be, for example, 80%, like the first percentage, and is not limited thereto. In the description given above, the normal-noise-added data generating unit 102 does not count the number of pieces of data equal to the average value, but the embodiment is not limited thereto. The normal-noise-added data generating unit 102 may include the number of pieces of data equal to the average value in the number of pieces of data larger than the average value or the number of pieces of data smaller than the average value, or may distribute the number of pieces of data equal to the average value to both the numbers at a predetermined ratio. For example, the predetermined ratio may be 50%:50%.

Subsequently, in step S403, the normal-noise-added data generating unit 102 adds noise to data in the first input data, the data being included in a range from the upper threshold value to the lower threshold value calculated in step S402, thereby calculating normal-noise-added data. Here, when the normal-noise-added data is represented by y, the value of the original first input data is represented by x, and a Gaussian random number of mean 0 and variance 1 is represented by a, the normal-noise-added data y can be calculated by using the following expression 4 or 5.

$$y = x \times (100+a)/100 \quad \text{Expression 4}$$

$$y = x + a \quad \text{Expression 5}$$

Figure 7:
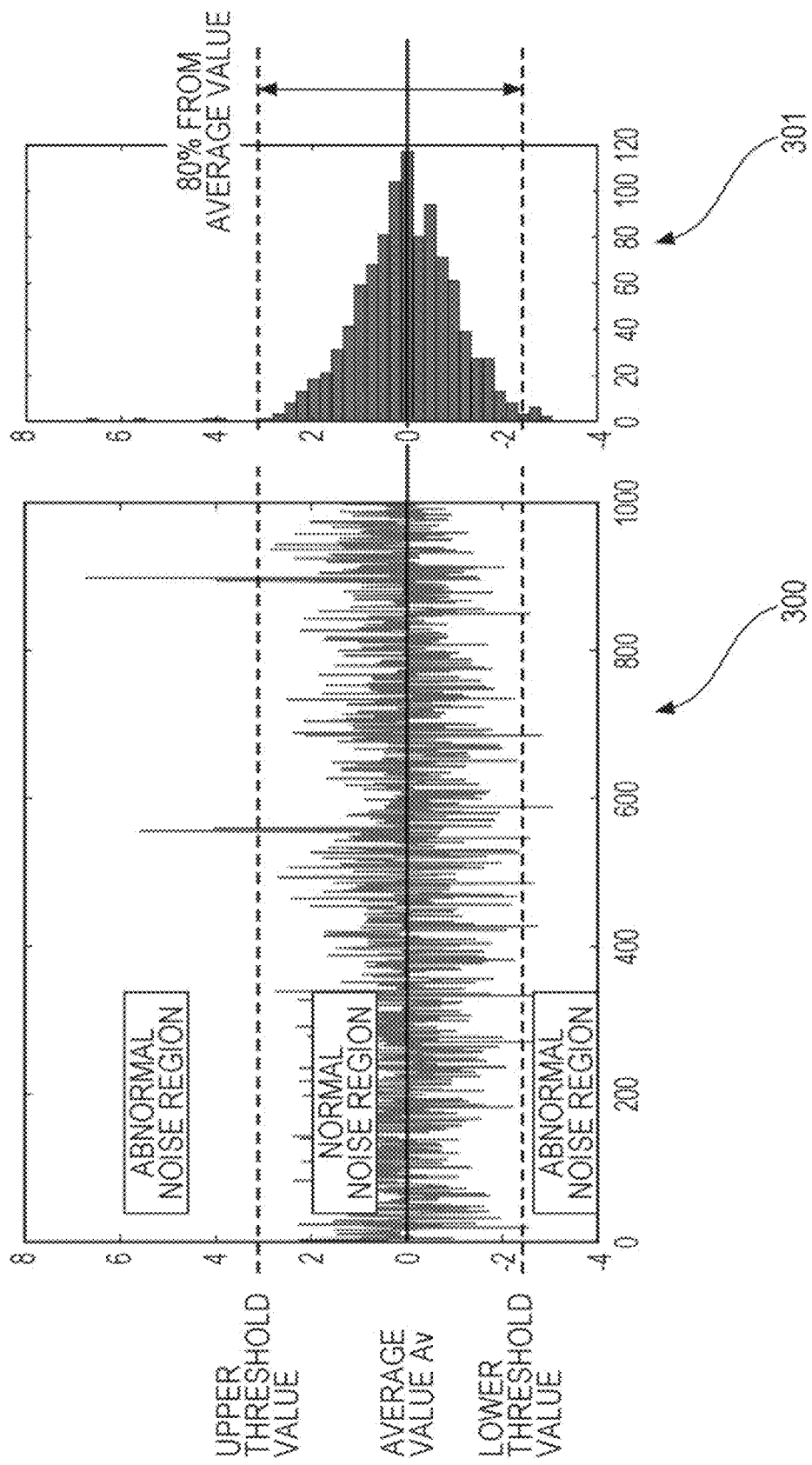
FIG. 7 is a schematic diagram illustrating an example of time-series data corresponding to the processes illustrated in FIGS. 6 and 9.

With reference to FIG. 7, a description will be given of a specific example in which normal noise is added to time-series data. FIG. 7 is a schematic diagram illustrating an example of time-series data corresponding to the processes illustrated in FIGS. 6 and 9. In FIG. 7, a graph 300 is an example of first input data, and a graph 301 is a histogram showing the distribution of the numbers of pieces of data of the same values in the first input data. In the graph 300, 0 to 1000 on the horizontal axis represent time sections of the first input data. The normal-noise-added data generating unit 102 calculates an average value Av of the pieces of data included in the time sections 0 to 1000 in the graph 300. The normal-noise-added data generating unit 102 counts the number of pieces of data included in the time sections 0 to 1000 and sets, as an upper threshold value, a value of data corresponding to the first percentage of the total number of pieces of data larger than the average value. In addition, the normal-noise-added data generating unit 102 sets, as a lower threshold value, a value of data corresponding to the second percentage of the total number of pieces of data smaller than the average value. Furthermore, the normal-noise-added data generating unit 102 adds noise to the data included in the range from the upper threshold value to the lower threshold value, thereby calculating normal-noise-added data. The region from the upper threshold value to the lower threshold value is the normal noise region illustrated in FIG. 7.

In addition, the normal-noise-added data generating unit 102 may calculate normal-noise-added data by using the time-series data illustrated in the graph in FIG. 7 as is, or may calculate normal-noise-added data by using data composed of differential values obtained by differentiating data values of the time-series data. The time-series data shown in the graph in FIG. 7 is, for example, data obtained through measurement or detection. The normal-noise-added data generating unit 102 may calculate and use differential values of the first input data instead of the first input data.

Figure 8:
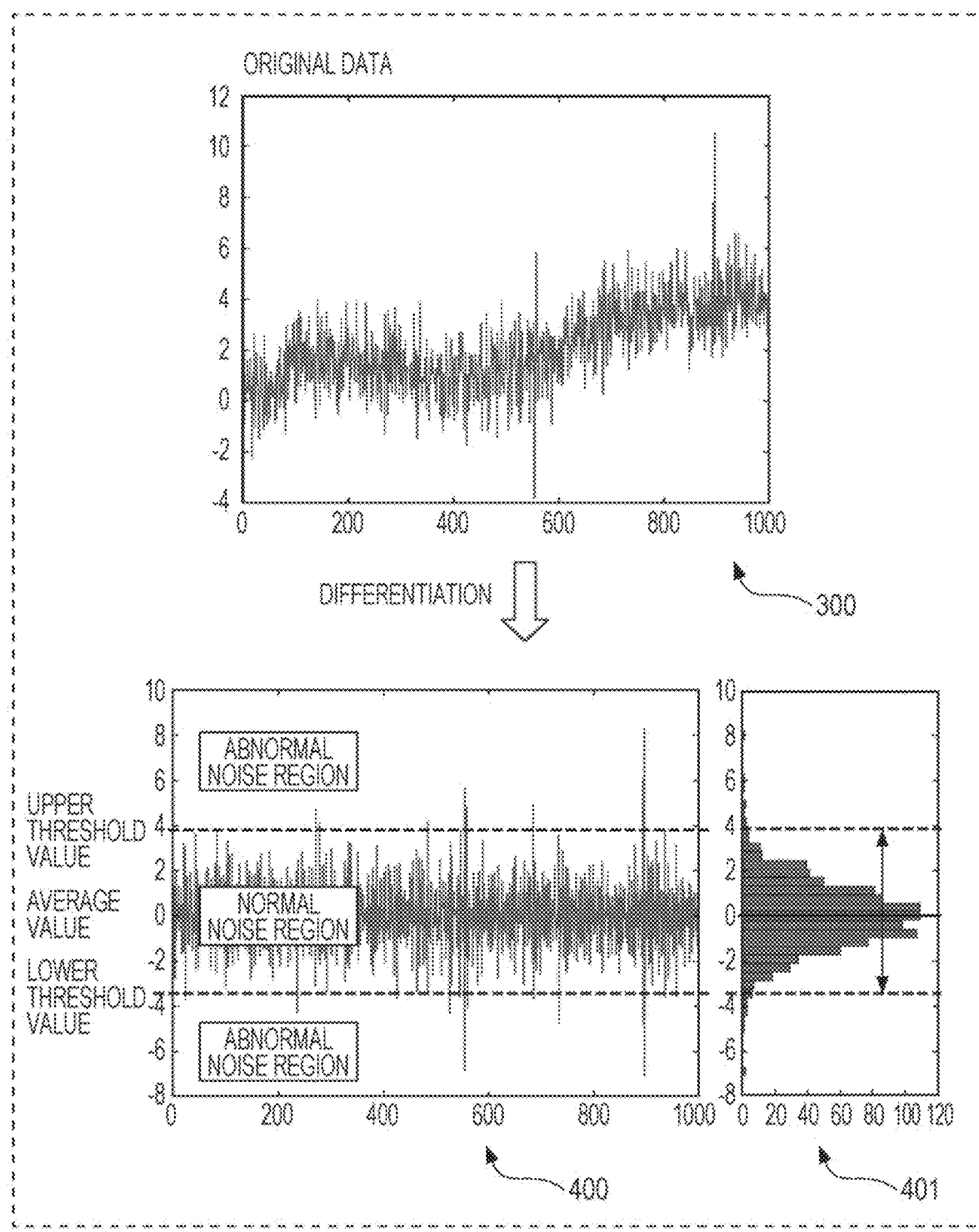
FIG. 8 is a schematic diagram illustrating an example of a process in the case of using differential values of first input data instead of the first input data.

FIG. 8 schematically illustrates an example of a process in the case of using differential values of first input data instead of the first input data. In FIG. 8, a graph 400 is an example of data composed of differential values of the data in the graph 300, and a graph 401 is a histogram showing the distribution of the numbers of the same differential values in the graph 400. The normal-noise-added data generating unit 102 calculates an average value, an upper threshold value, and a lower threshold value for the data composed of differential values illustrated in FIG. 8, adds noise that is based on expression 4 or 5 given above to the data included in the range from the upper threshold value to the lower threshold value, and thereby calculates normal-noise-added data. In expressions 4 and 5, a differential value of data is applied to "x". The region from the upper threshold value to the lower threshold value is the normal noise region illustrated in FIG. 8.

In the case of using differential values of first input data instead of the first input data, the differential values of the first input data, normal-noise-added data of the differential values of the first input data, and abnormal-noise-added data of the differential values of the first input data are input to the neural network 211, and a first normal score, a second normal score, and a third normal score are output in step S104 in FIG. 2. The neural network 211 is configured to, in response to receipt of a differential value of input data, output a normal score of the differential value. With use of the first normal score, the second normal score, and the third normal score that have been output, neural network parameters that make the third difference smallest are calculated. Furthermore, in steps S107 to S111, differential values of the second input data are input to the neural network 211, and it is determined, based on a fourth normal score output thereby, whether the second input data is normal or abnormal.

As described above, the anomaly detection device 100 performs the process from step S401 to step S403, thereby calculating normal-noise-added data in step S102 in FIG. 2.

Figure 9:
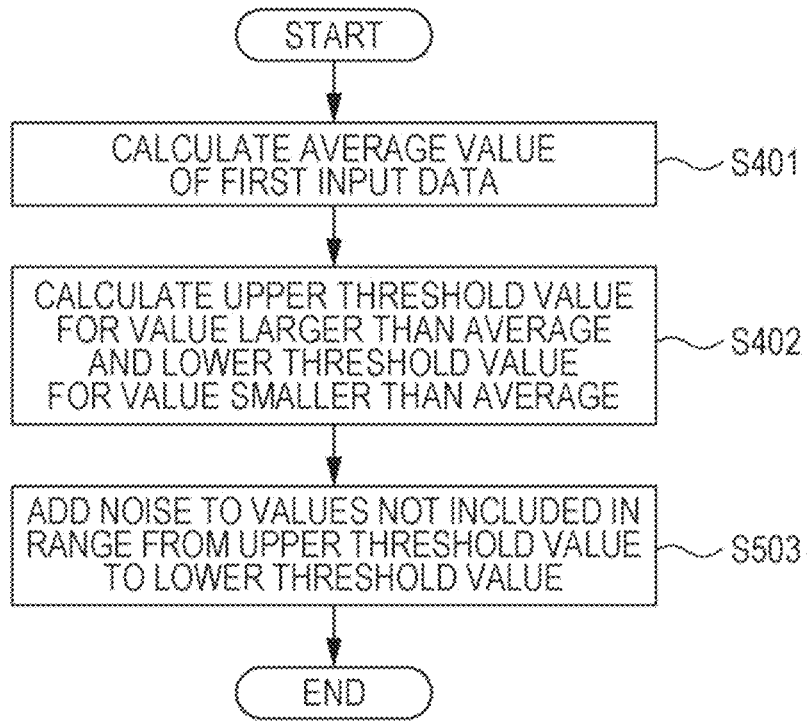
FIG. 9 is a flowchart illustrating an example of the details of a process performed in a case where first input data is time-series data in step S103 in FIG. 2.

Next, with reference to FIG. 9, a description will be given of a method for calculating abnormal-noise-added data, which corresponds to step S103 in FIG. 2, in a case where first input data is time-series data. FIG. 9 is a flowchart illustrating an example of the details of a process performed in a case where the kind of first input data is time-series data in step S103 in FIG. 2.

First, the abnormal-noise-added data generating unit 103 performs steps S401 and S402, like the normal-noise-added data generating unit 102. Subsequently, in step S503, the abnormal-noise-added data generating unit 103 adds noise to data in the first input data, the data not being included in a range from the upper threshold value to the lower threshold value calculated in step S402, thereby calculating abnormal-noise-added data. For example, in FIG. 7, there are two abnormal noise regions that are not included in the range from the upper threshold value to the lower threshold value. Here, when abnormal-noise-added data is represented by y, the value of the original first input data is represented by x, and a Gaussian random number of mean 0 and variance 1 is represented by a, the abnormal-noise-added data y can be calculated by using the following expression 6 or 7.

$$y = x \times (100+a)/100 \quad \text{Expression 6}$$

$$y = x + a \quad \text{Expression 7}$$

As described above, the anomaly detection device 100 performs the process including steps S401, S402, and S503, thereby calculating abnormal-noise-added data in step S103 in FIG. 2. Also in the case of calculating abnormal-noise-added data, the abnormal-noise-added data generating unit 103 may calculate and use differential values of the first input data instead of the first input data.

Figure 10:
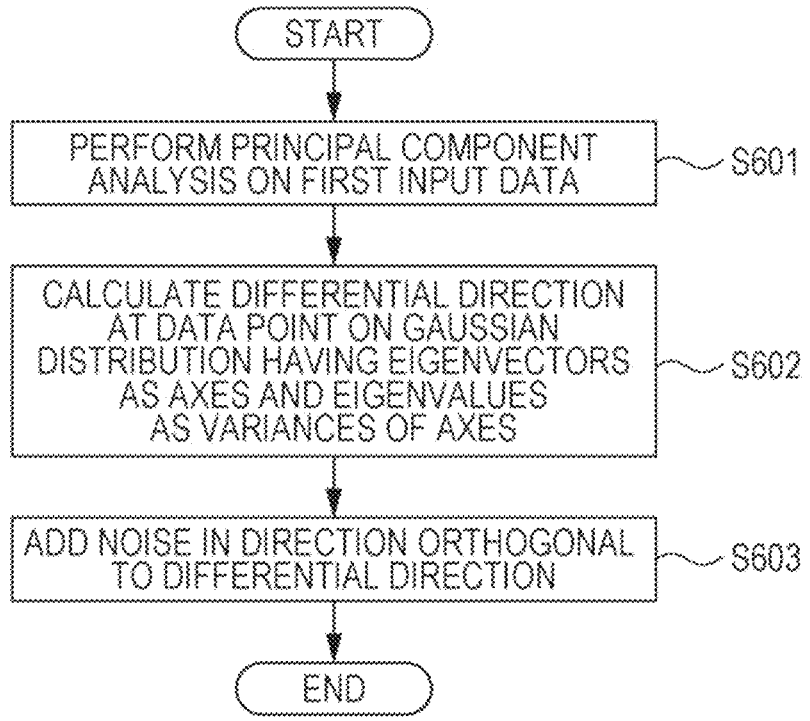
FIG. 10 is a flowchart illustrating an example of the details of a process performed in a case where first input data is multidimensional data in step S102 in FIG. 2.

Next, with reference to FIG. 10, a description will be given of a method for calculating normal-noise-added data, which corresponds to step S102 in FIG. 2, in a case where first input data is multidimensional data. FIG. 10 is a flowchart illustrating an example of the details of a process performed in a case where the kind of first input data is multidimensional data in step S102 in FIG. 2.

First, in step S601, the normal-noise-added data generating unit 102 performs principal component analysis on the first input data, which is multidimensional data, and obtains eigenvectors and eigenvalues. In the principal component analysis, principal components are obtained, the number of which is the same as the number of variables of the multidimensional data. For example, a first principal component is a linear combination having the largest variance among various linear combinations of variables. A second principal component is a linear combination having the largest variance among linear combinations under the condition of not being correlated with the first principal component. Likewise, a third principal component or a subsequent principal component is a linear combination having the largest variance among linear combinations under the condition of not being correlated with the preceding principal component. That is, orthogonal components converted in order from the largest variance as linear combinations of variables are obtained as principal components. An eigenvalue represents the variance of a principal component. An eigenvector is a vector whose elements are weighting coefficients to be multiplied by individual variables in the case of representing a principal component by using variables of multidimensional data.

Subsequently, in step S602, the normal-noise-added data generating unit 102 calculates a differential direction for the first input data on a Gaussian distribution having the eigenvectors calculated in step S601 as axes and having the eigenvalues calculated in step S601 as variances of the corresponding axes. Specifically, the normal-noise-added data generating unit 102 calculates a direction in which the value of the Gaussian distribution on the coordinates of the first input data is decreased. The coordinates of the first input data are coordinates in a multidimensional coordinate system having the variables of the first input data as elements.

Subsequently, in step S603, the normal-noise-added data generating unit 102 adds, to the first input data, noise in a direction perpendicular to the differential direction calculated in step S602, thereby calculating normal-noise-added data. The direction perpendicular to the differential direction is an example of a normal noise direction. Here, for example, when the normal-noise-added data is represented by y, the differential direction calculated in step S602 is represented by df/dx, the value of the original first input data is represented by x, and a Gaussian random number of mean 0 and variance 1 is represented by a, the normal-noise-added data y can be calculated by using the following expression 8. Note that "·" in expression 8 represents an inner product. In a case where the first input data is M-dimensional data, "y", "x", and "a" are M-dimensional vectors. "f" represents the Gaussian distribution that is referred to in step S602 and is defined by the space of the M-dimensional coordinate system in which the vector x of the first input data is defined. "f" is a mapping function from M dimension to one dimension (scalar). "d" is a differential operator.

$$y = x + a - ((df(x)/dx) \cdot a) df(x)/dx = x + a - (df/dx \cdot a) df/dx \quad \text{Expression 8}$$

In expression 8, "a" represents noise, "(df/dx·a)df/dx" represents a noise component parallel to df/dx, that is, the differential direction, and "a−(df/dx·a)df/dx" represents a noise component perpendicular to the differential direction.

Figure 11:
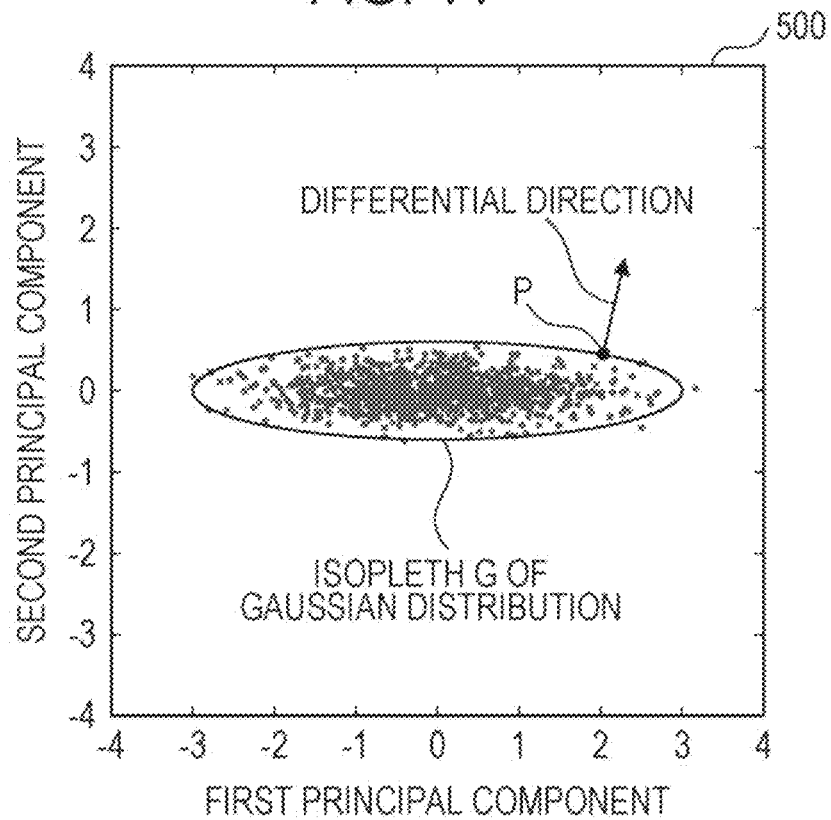
FIG. 11 is a schematic diagram illustrating an example of multidimensional data corresponding to the process illustrated in FIG. 10.

Now, with reference to FIG. 11, a description will be given of a specific example in which normal noise is added to multidimensional data. FIG. 11 is a schematic diagram illustrating an example of multidimensional data corresponding to the process illustrated in FIG. 10. In FIG. 11, a graph 500 shows an example of the relationship between a first principal component and a second principal component that are obtained by performing principal component analysis on the first input data. The graph 500 also shows an isopleth G of a Gaussian distribution. The isopleth G of the Gaussian distribution is an isopleth of the Gaussian distribution having eigenvectors as axes and eigenvalues as variances of the corresponding axes for the first principal component and the second principal component. Data points, which are points on the isopleth G corresponding to individual data values included in the first input data, are calculated, and differential directions are calculated at the individual data points. In FIG. 11, a differential direction at a data point P on the isopleth G corresponding to one of the data values included in the first input data is indicated by an arrow.

The differential direction at the data point, that is, the differential direction of the first principal component and the second principal component at the data point, is an outward direction from the isopleth G and is regarded as a direction of abnormal noise. The outward direction from the isopleth G is a direction in which a normal score decreases. The direction perpendicular to the differential direction is a direction along the isopleth G, that is, a tangent direction, and is regarded as a direction of normal noise. The direction along the isopleth G is a direction in which a normal score does not increase or decrease. An inward direction from the isopleth G is a direction in which a normal sore increases. As shown in expression 8, at each data point on the isopleth G, normal-noise-added data for the data value at the data point is calculated by using the differential direction calculated at the data point.

As described above, the anomaly detection device 100 performs the process from step S601 to step S603, thereby calculating normal-noise-added data in step S102 in FIG. 2.

Figure 12:
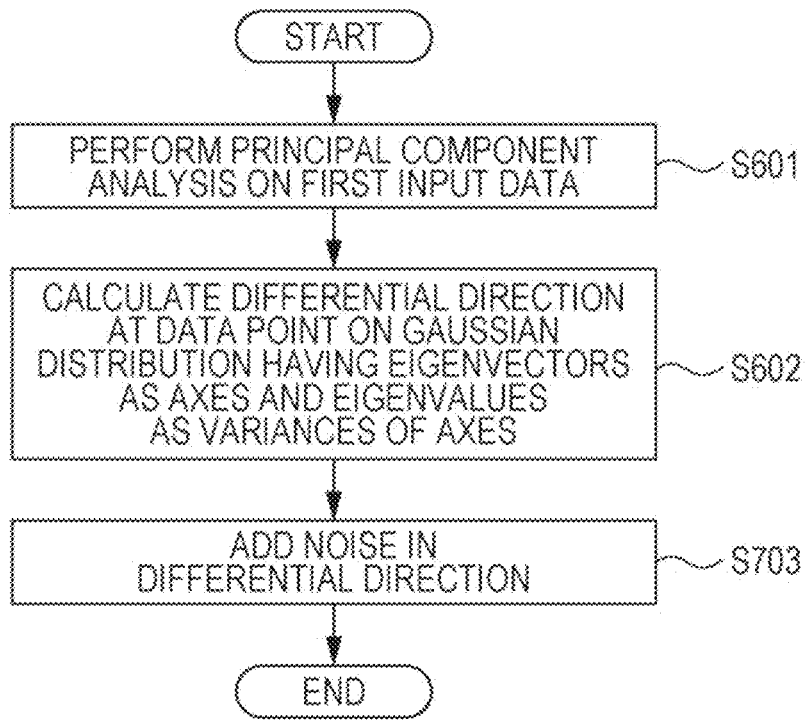
FIG. 12 is a flowchart illustrating an example of the details of a process performed in a case where first input data is multidimensional data in step S103 in FIG. 2.

Next, with reference to FIG. 12, a description will be given of a method for calculating abnormal-noise-added data, which corresponds to step S103 in FIG. 2, in a case where first input data is multidimensional data. FIG. 12 is a flowchart illustrating an example of the details of a process performed in a case where the kind of first input data is multidimensional data in step S103 in FIG. 2.

First, the abnormal-noise-added data generating unit 103 performs steps S601 and S602, like the normal-noise-added data generating unit 102. Subsequently, in step S703, the abnormal-noise-added data generating unit 103 adds, to the first input data, noise in the differential direction calculated in step S602, thereby calculating abnormal-noise-added data. The differential direction is an example of an abnormal noise direction, which is orthogonal to the normal noise direction. For example, in FIG. 11, an outward differential direction from the point P on the isopleth G of the Gaussian distribution is an abnormal noise direction. Here, for example, when the abnormal-noise-added data is represented by y, the differential direction calculated in step S602 is represented by df/dx, the value of the original first input data is represented by x, and a Gaussian random number of mean 0 and variance 1 is represented by a, the abnormal-noise-added data y can be calculated by using the following expression 9. Note that "·" in expression 9 represents an inner product.

$$y=x+|(df(x)/dx)\cdot a|df(x)/dx=x+|df/dx\cdot a|df/dx \qquad \text{Expression 9}$$

In expression 9, "|df/dx·a|df/dx" represents a noise component in a direction parallel to df/dx, that is, the differential direction, and a direction in which f decreases.

As describe above, the anomaly detection device 100 performs the process including steps S601, S602, and S703, thereby calculating abnormal-noise-added data in step S103 in FIG. 2.

As described above, according to the anomaly detection device 100, normal noise and abnormal noise are used as noise to be added to the first input data. Accordingly, the approximation accuracy of the distribution of normal data can be increased, and the value of an objective function can be calculated more accurately during learning. As a result, learning of a normal model can be improved and the performance of anomaly detection can be increased.

The anomaly detection device and so forth according to of the present disclosure has been described above based on an embodiment, but the present disclosure is not limited to the embodiment. An embodiment implemented by applying various modifications conceived by a person skilled in the art to the embodiment, an embodiment implemented by combining elements in different embodiments, and so forth are included in the scope of the present disclosure without deviating from the gist of the present disclosure.

Specifically, the above-described anomaly detection device and so forth may be configured as a computer system composed of a microprocessor, a ROM, a RAM, a hard disk drive, a display unit, a keyboard, a mouse, and so forth. The RAM or the hard disk drive stores a computer program. When the microprocessor operates in accordance with the computer program, the anomaly detection device and so forth achieve their functions. Here, the computer program is a combination of instruction codes indicating instructions for a computer to achieve a predetermined function.

Furthermore, some or all of the elements constituting the above-described anomaly detection device and so forth may be formed of a single system large scale integration (LSI). The system LSI is a super multifunction LSI that is manufactured by integrating elements on a single chip, and is specifically a computer system including a microprocessor, a ROM, a RAM, and so forth. The RAM stores a computer program. When the microprocessor operates in accordance with the computer program, the system LSI achieves its functions.

Furthermore, some or all of the elements constituting the above-described anomaly detection device and so forth may be formed of an integrated circuit (IC) card or an independent module that is attachable to/detachable from the device. Each of the IC card and the module is a computer system including a microprocessor, a ROM, a RAM, and so forth. Each of the IC card and the module may include the above-described super multifunction LSI. When the microprocessor operates in accordance with the computer program, the IC card and the module achieve their functions. The IC card and the module may be tamper-resistant.

The technique of the present disclosure may be the methods described above, a computer program causing a computer to perform the methods, or a digital signal composed of the computer program.

Furthermore, the technique of the present disclosure may be a non-transitory computer-readable recording medium, such as a flexible disk, a hard disk, a CD-ROM, an MO, a DVD, a DVD-ROM, a DVD-RAM, a Blu-ray (registered trademark) disc (BD), or a semiconductor memory, storing the computer program or the digital signal, or the digital signal stored in the non-transitory recording medium.

The technique of the present disclosure may be a technique for transmitting the computer program or the digital signal through an electric communication line, a wireless or wired communication line, a network represented by the Internet, data broadcasting, or the like.

The technique of the present disclosure may be a computer system including a microprocessor and a memory. The memory may store the computer program, and the microprocessor may operate in accordance with the computer program.

The program or the digital signal may be transferred by storing it in the non-transitory recording medium or may be transferred through the network or the like, so that the program or the digital signal may be executed by another independent computer system.

The present disclosure enables highly accurate anomaly detection and is thus useful for the technique of detecting failure or detecting anomaly in a monitoring system or the like.

What is claimed is:

1. An anomaly detection method comprising:
   (a1) obtaining first data which is normal data, the normal data being data that s determined to be normal by a neural network;
   (a2) generating second data by adding normal noise to the first data by using a method predetermined in accordance with a kind of the first data, the second data being data that is determined to be normal by the neural network;
   (a3) generating third data by adding abnormal noise to the first data by using a method predetermined in accordance with the kind of the first data, the third data being data that is determined to be abnormal by the neural network;
   (a4) inputting the first data, the second data, and the third data to the neural network and calculating a first normal score, a second normal score, and a third normal score, each of the first normal score, the second normal score, and the third normal score being a value indicating how much a corresponding one of the first data, the second data, and the third data input to the neural network is likely to be normal data;
   (a5) calculating a first difference that is based on a difference between the first normal score and the second normal score, calculating a second difference that is based on a difference between the first normal score and the third normal score, and calculating a third difference that is based on a difference between the first difference and the second difference;
   (a6) calculating parameters of the neural network, the parameters making the third difference smallest;
   (a7) changing the neural network by using the parameters that have been calculated; and
   (a8) obtaining fourth data from a test database storing data that is unknown in terms of whether the data is normal or abnormal, inputting the fourth data to the neural network that has been changed, calculating a fourth normal score, and determining, based on the fourth normal score, whether the fourth data is normal or abnormal, wherein at least one of the (a1) to the (a8) is executed by a processor.

2. The anomaly detection method according to claim 1, wherein in a case where the first data is an image, the anomaly detection method further comprises:

between the (a1) and the (a2), (b1) detecting pixel positions of edges included in the image; and (b2) setting, as an abnormal noise region, a region of pixel positions that are at a first distance or less from the pixel positions of the edges, and setting, as a normal noise region, a region that is not included in the abnormal noise region in the image, wherein the predetermined method in the (a2) is generating the second data by adding noise to the normal noise region, and the predetermined method in the (a3) is generating the third data by adding noise to the abnormal noise region.

3. The anomaly detection method according to claim 1, wherein in a case where the first data is time-series data having data values corresponding to times, the anomaly detection method further comprises:

in the (a1), (c1) calculating an average value of the data values;

(c2) counting a number of large data values larger than the average value among the data values in order from a data value closest to the average value, setting, as an upper threshold value, a data value corresponding to a predetermined percentage of a total number of the large data values, counting a number of small data values smaller than the average value among the data values in order from a data value closest to the average value, and setting, as a lower threshold value, a data value corresponding to a predetermined percentage of a total number of the small data values;

(c3) setting, as a normal noise region, a region included in a range from the upper threshold value to the lower threshold value; and (c4) setting, as an abnormal noise region, a region not included in the normal noise region, wherein in the (a2), in a case where an i-th data value included in the data values is included in the normal noise region, the normal noise is added to the i-th data value, and in the (a3), in a case where a j-th data value included in the data values is included in the abnormal noise region, the abnormal noise is added to the j-th data value.

4. The anomaly detection method according to claim 1, wherein in a case where the first data is time-series data having data values corresponding to times, the anomaly detection method further comprises:

in the (a1), (d1) calculating differential data values corresponding to the data values;

(d2) calculating an average value of the differential data values;

(d3) counting a number of large differential data values larger than the average value among the differential data values in order from a differential data value closest to the average value, setting, as an upper threshold value, a differential data value corresponding to a predetermined percentage of a total number of the large differential data values, counting a number of small differential data values smaller than the average value among the differential data values in order from a differential data value closest to the average value, and setting, as a lower threshold value, a differential data value corresponding to a predetermined percentage of a total number of the small differential data values;

(d4) setting, as a normal noise region, a region included in a range from the upper threshold value to the lower threshold value; and (d5) setting, as an abnormal noise region, a region not included in the normal noise region, wherein in the (a2) to the (a4), the differential data values are used instead of the data values of the first data, in the (a2), in a case where an i-th differential data value included in the differential data values is included in the normal noise region, the normal noise is added to the i-th differential data value, in the (a3), in a case where a j-th differential data value included in the differential data values is included in the abnormal noise region, the abnormal noise is added to the j-th differential data value, and in the (a8), differential values of data values included in the fourth data are used instead of the data values included in the fourth data.

5. The anomaly detection method according to claim 1, wherein in a case where the first data is multidimensional data, the anomaly detection method further comprises:

in the (a1), (e1) performing principal component analysis on the first data and calculating an eigenvalue and an eigenvector of a principal component;

(e2) calculating, based on the eigenvalue and the eigenvector, a differential direction of the first data;

(e3) setting the differential direction as an abnormal noise direction; and (e4) setting a direction perpendicular to the abnormal noise direction as a normal noise direction, wherein the predetermined method in the (a2) is generating the second data by adding noise in the normal noise direction to the first data, and the predetermined method in the (a3) is generating the third data by adding noise in the abnormal noise direction to the first data.

6. The anomaly detection method according to claim 1, wherein the (a7) includes calculating an amount of change in the third difference before and after the neural network changes, changing the neural network in a case where the third difference decreases, and changing the neural network at a probability that is based on the amount of change in the third difference in a case where the third difference increases.

7. A recording medium storing a program that causes a device including a processor to execute a process, the recording medium being nonvolatile and computer-readable, the process comprising:

(a1) obtaining first data which is normal data, the normal data being data that is determined to be normal by a neural network;

(a2) generating second data by adding normal noise to the first data by using a method predetermined in accordance with a kind of the first data, the second data being data that is determined to be normal by the neural network;

(a3) generating third data by adding abnormal noise to the first data by using a method predetermined in accordance with the kind of the first data, the third data being data that is determined to be abnormal by the neural network;

(a4) inputting the first data, the second data, and the third data to the neural network and calculating a first normal score, a second normal score, and a third normal score, each of the first normal score, the second normal score, and the third normal score being a value indicating how much a corresponding one of the first data, the second data, and the third data input to the neural network is likely to be normal data;

(a5) calculating a first difference that is based on a difference between the first normal score and the second normal score, calculating a second difference that is based on a difference between the first normal score and the third normal score, and calculating a third difference that is based on a difference between the first difference and the second difference;

(a6) calculating parameters of the neural network, the parameters making the third difference smallest;

(a7) changing the neural network by using the parameters that have been calculated; and (a8) obtaining fourth data from a test database storing data that is unknown in terms of whether the data is normal or abnormal, inputting the fourth data to the neural network that has been changed, calculating a fourth normal score, and determining, based on the fourth normal score, whether the fourth data is normal or abnormal.

8. The recording medium according to claim 7, wherein in a case where the first data is an image, the process further comprises:

between the (a1) and the (a2), (b1) detecting pixel positions of edges included in the image; and (b2) setting, as an abnormal noise region, a region of pixel positions that are at a first distance or less from the pixel positions of the edges, and setting, as a normal noise region, a region that is not included in the abnormal noise region in the image, wherein the predetermined method in the (a2) is generating the second data by adding noise to the normal noise region, and the predetermined method in the (a3) is generating the third data by adding noise to the abnormal noise region.

9. The recording medium according to claim 7, wherein in a case where the first data is time-series data having data values corresponding to times, the process further comprises;

in the (a1), (c1) calculating an average value of the data values;

(c2) counting a number of large data values larger than the average value among the data values in order from a data value closest to the average value, setting, as an upper threshold value, a data value corresponding to a predetermined percentage of a total number of the large data values, counting a number of small data values smaller than the average value among the data values in order from a data value closest to the average value, and setting, as a lower threshold value, a data value corresponding to a predetermined percentage of a total number of the small data values;

(c3) setting, as a normal noise region, a region included in a range from the upper threshold value to the lower threshold value; and (c4) setting, as an abnormal noise region, a region not included in the normal noise region, wherein in the (a2), in a case where an i-th data value included in the data values is included in the normal noise region, the normal noise is added to the i-th data value, and in the (a3), in a case where a j-th data value included in the data values is included in the abnormal noise region, the abnormal noise is added to the j-th data value.

10. The recording medium according to claim 7, wherein in a case where the first data is time-series data having data values corresponding to times, the process further comprises:

in the (a1), (d1) calculating differential data values corresponding to the data values;

(d2) calculating an average value of the differential data values;

(d3) counting a number of large differential data values larger than the average value among the differential data values in order from a differential data value closest to the average value, setting, as an upper threshold value, a differential data value corresponding to a predetermined percentage of a total number of the large differential data values, counting a number of small differential data values smaller than the average value among the differential data values in order from a differential data value closest to the average value, and setting, as a lower threshold value, a differential data value corresponding to a predetermined percentage of a total number of the small differential data values;

(d4) setting, as a normal noise region, a region included in a range from the upper threshold value to the lower threshold value; and (d5) setting, as an abnormal noise region, a region not included in the normal noise region, wherein in the (a2) to the (a4), the differential data values are used instead of the data values of the first data, in the (a2), in a case where an i-th differential data value included in the differential data values is included in the normal noise region, the normal noise is added to the i-th differential data value, in the (a3), in a case where a j-th differential data value included in the differential data values is included in the abnormal noise region, the abnormal noise is added to the j-th differential data value, and in the (a8), differential values of data values included in the fourth data are used instead of the data values included in the fourth data.

11. The recording medium according to claim 7, wherein in a case where the first data is multidimensional data, the process further comprises;

in the (a1), (e1) performing principal component analysis on the first data and calculating an eigenvalue and an eigenvector of a principal component;

(e2) calculating, based on the eigenvalue and the eigenvector, a differential direction of the first data;

(e3) setting the differential direction as an abnormal noise direction; and (e4) setting a direction perpendicular to the abnormal noise direction as a normal noise direction, wherein the predetermined method in the (a2) is generating the second data by adding noise in the normal noise direction to the first data, and the predetermined method in the (a3) is generating the third data by adding noise in the abnormal noise direction to the first data.

12. The recording medium according to claim 7, wherein the (a7) includes calculating an amount of change in the third difference before and after the neural network changes, changing the neural network in a case where the third difference decreases, and changing the neural network at a probability that is based on the amount of change in the third difference in a case where the third difference increases.

13. An anomaly detection method comprising:

(a1) obtaining first data, a neural network calculating a score equal to or more than a threshold value using the first data as an input to the neural network and parameters of the neural network;

(a2) generating second data by adding normal noise to the first data using a method predetermined in accordance with a kind of the first data, the neural network calculating a score equal to or more than the threshold value using the second data as an input to the neural network and the parameters;

(a3) generating third data by adding abnormal noise to the first data using a method predetermined in accordance with the kind of the first data, the neural network calculating a score less than the threshold value using the third data as an input to the neural network and the parameters;

(a4) determining i-th parameters of the neural network corresponding to a minimum resulting value from among a first resulting value, . . . , and an n-th resulting value, the first resulting value, . . . and the n-th resulting value and first parameters of the neural network, . . . , and n-th parameters of the neural network being in a one-to-one relationship, a j-th resulting value being calculated based on a first difference and a second difference, the first difference being calculated based on a first score and a second score, the second difference being calculated based on the first score and a third score, the first score being calculated by the neural network using the first data as an input to the neural network and j-th parameters of the neural network, the second score being calculated by the neural network using the second data as an input to the neural network and the j-th parameters, the third score being calculated by the neural network using the third data as an input to the neural network and the j-th parameters, n, i, and j being natural numbers, $n \geq 2$, $i \leq n$, and $j \leq n$; and (a5) detecting whether fourth data is normal or abnormal based on a fourth score, the neural network calculating the fourth score using the fourth data as an input to the neural network and the i-th parameters.

* * * * *